US010356868B2

(12) United States Patent
Stevens, Jr. et al.

(10) Patent No.: US 10,356,868 B2
(45) Date of Patent: Jul. 16, 2019

(54) LOAD CONTROL DEVICE FOR A LIGHT-EMITTING DIODE LIGHT SOURCE

(71) Applicant: Lutron Technology Company LLC, Coopersburg, PA (US)

(72) Inventors: Robert D. Stevens, Jr., Emmaus, PA (US); Matthew R. Zartman, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/127,163

(22) Filed: Sep. 10, 2018

(65) Prior Publication Data

US 2019/0008012 A1 Jan. 3, 2019

Related U.S. Application Data

(63) Continuation of application No. 15/583,425, filed on May 1, 2017, now Pat. No. 10,104,735, which is a (Continued)

(51) Int. Cl.
*H05B 37/02* (2006.01)
*H05B 33/08* (2006.01)

(52) U.S. Cl.
CPC ..... *H05B 33/0848* (2013.01); *H05B 33/0812* (2013.01); *H05B 33/0815* (2013.01); (Continued)

(58) Field of Classification Search
CPC ............ H05B 33/0815; H05B 33/0836; H05B 33/0839; H05B 33/0845 (Continued)

(56) References Cited

U.S. PATENT DOCUMENTS 5,568,044 A 10/1996 Bittner
6,580,258 B2 6/2003 Wilcox et al.
(Continued)

FOREIGN PATENT DOCUMENTS

CN 102612227 A 7/2012
DE 102009041943 A1 3/2011
(Continued)

OTHER PUBLICATIONS

Wikipedia, "Forward Converter", Available online at <http://en.wikipedia.org/wiki/Forward_converter>, retrieved on Mar. 16, 2015, 2 pages.

*Primary Examiner* — Thuy V Tran
(74) *Attorney, Agent, or Firm* — Condo Roccia Koptiw LLP

(57) ABSTRACT

A load control device for an electrical load operates in a normal mode and a burst mode to adjust the amount of power delivered to the electrical load. The load control device comprises a control circuit that operates in the normal mode to regulate an average magnitude of a load current conducted through the load between a maximum rated current and a minimum rated current. During the normal mode, the control circuit controls the operating period of a load regulation circuit between a high-end operating period and a low-end operating period. The control circuit operates in the burst mode to regulate the average magnitude of the load current below the minimum rated current. During the burst mode, the control circuit adjusts the low-end operating period to be less than or equal to a minimum on time of the load regulation circuit.

20 Claims, 15 Drawing Sheets

Related U.S. Application Data continuation of application No. 15/186,254, filed on Jun. 17, 2016, now Pat. No. 9,655,180.

(60) Provisional application No. 62/182,110, filed on Jun. 19, 2015.

(52) U.S. Cl.
CPC ..... *H05B 33/0851* (2013.01); *H05B 37/0281* (2013.01); *H05B 33/0845* (2013.01); *H05B 37/0272* (2013.01)

(58) Field of Classification Search
USPC .......................... 315/224, 276, 291, 308, 360
See application file for complete search history.

(56) References Cited

U.S. PATENT DOCUMENTS

| | | | |
|---|---|---|---|
| 6,580,309 B2 | 6/2003 | Jacobs et al. |
| 6,707,264 B2 | 3/2004 | Lin et al. |
| 6,788,006 B2 | 9/2004 | Yamamoto |
| 6,841,947 B2 | 1/2005 | Berg-johansen |
| 7,061,191 B2 | 6/2006 | Chitta |
| 7,071,762 B2 | 7/2006 | Xu et al. |
| 7,102,339 B1 | 9/2006 | Ferguson |
| 7,102,340 B1 | 9/2006 | Ferguson |
| 7,211,966 B2 | 5/2007 | Green et al. |
| 7,420,333 B1 | 9/2008 | Hamdad et al. |
| 7,535,183 B2 | 5/2009 | Gurr |
| 7,642,734 B2 | 1/2010 | De Anna |
| 7,759,881 B1 | 7/2010 | Melanson |
| 7,791,584 B2 | 9/2010 | Korcharz et al. |
| 7,855,520 B2 | 12/2010 | Leng |
| 7,863,827 B2 | 1/2011 | Johnsen et al. |
| 7,911,153 B2 | 3/2011 | Srimuang |
| 7,923,939 B1 | 4/2011 | Hamdad et al. |
| 8,044,608 B2 | 10/2011 | Kuo et al. |
| 8,076,867 B2 | 12/2011 | Kuo et al. |
| 8,154,223 B2 | 4/2012 | Hsu et al. |
| 8,198,832 B2 | 6/2012 | Bai et al. |
| 8,217,591 B2 | 7/2012 | Chobot et al. |
| 8,258,710 B2 | 9/2012 | Alexandrovich et al. |
| 8,258,714 B2 | 9/2012 | Liu |
| 8,283,875 B2 | 10/2012 | Grotkowski et al. |
| 8,288,967 B2 | 10/2012 | Liu |
| 8,288,969 B2 | 10/2012 | Hsu et al. |
| 8,299,987 B2 | 10/2012 | Neudorf et al. |
| 8,310,845 B2 | 11/2012 | Gaknoki et al. |
| 8,319,448 B2 | 11/2012 | Cecconello et al. |
| 8,339,053 B2 | 12/2012 | Yamasaki et al. |
| 8,339,063 B2 | 12/2012 | Yan et al. |
| 8,339,066 B2 | 12/2012 | Thornton et al. |
| 8,339,067 B2 | 12/2012 | Lin et al. |
| 8,354,804 B2 | 1/2013 | Otake et al. |
| 8,368,322 B2 | 2/2013 | Yu et al. |
| 8,378,589 B2 | 2/2013 | Kuo et al. |
| 8,400,079 B2 | 3/2013 | Kanamori et al. |
| 8,427,081 B2 | 4/2013 | Hsu et al. |
| RE44,228 E | 5/2013 | Park et al. |
| 8,466,628 B2 | 6/2013 | Shearer et al. |
| 8,482,219 B2 | 7/2013 | Kuo et al. |
| 8,487,540 B2 | 7/2013 | Dijkstra et al. |
| 8,487,546 B2 | 7/2013 | Melanson |
| 8,492,982 B2 | 7/2013 | Hagino et al. |
| 8,492,987 B2 | 7/2013 | Nuhfer et al. |
| 8,492,988 B2 | 7/2013 | Nuhfer et al. |
| 8,508,150 B2 | 8/2013 | Kuo et al. |
| 8,541,952 B2 | 9/2013 | Darshan |
| 8,558,474 B1 | 10/2013 | Zhang et al. |
| 8,558,518 B2 | 10/2013 | Irissou et al. |
| 8,581,511 B2 | 11/2013 | Kim et al. |
| 8,587,968 B2 | 11/2013 | Zhu et al. |
| 8,593,069 B2 | 11/2013 | Kang et al. |
| 8,598,804 B2 | 12/2013 | Foxall et al. |
| 8,624,526 B2 | 1/2014 | Huang |
| 8,664,888 B2 | 3/2014 | Nuhfer et al. |
| 8,810,159 B2 | 8/2014 | Nuhfer et al. |
| 9,231,485 B2 | 1/2016 | Ryu et al. |
| 9,245,734 B2 | 1/2016 | Goscha et al. |
| 9,247,608 B2 | 1/2016 | Chitta et al. |
| 9,565,731 B2 | 2/2017 | DeJonge |
| 2006/0273772 A1 | 12/2006 | Groom |
| 2008/0043504 A1 | 2/2008 | Ye et al. |
| 2008/0088292 A1* | 4/2008 | Stoichita ............... H02M 3/156 323/285 |
| 2008/0175029 A1 | 7/2008 | Jung et al. |
| 2009/0160360 A1 | 6/2009 | Lim et al. |
| 2012/0313545 A1* | 12/2012 | Courtel .............. H05B 33/0815 315/250 |
| 2013/0063047 A1 | 3/2013 | Veskovic |
| 2013/0063100 A1 | 3/2013 | Henzler |
| 2013/0141001 A1 | 6/2013 | Datta et al. |
| 2013/0229829 A1 | 9/2013 | Zhang et al. |
| 2013/0234612 A1 | 9/2013 | Zeng |
| 2013/0278145 A1 | 10/2013 | Lin et al. |
| 2014/0009084 A1 | 1/2014 | Veskovic |
| 2014/0009085 A1 | 1/2014 | Veskovic |
| 2014/0184076 A1 | 7/2014 | Murphy |
| 2014/0312796 A1 | 10/2014 | Sauerlander et al. |
| 2014/0354170 A1 | 12/2014 | Gredler et al. |

FOREIGN PATENT DOCUMENTS

| | | |
|---|---|---|
| EP | 2 383 873 B1 | 4/2010 |
| EP | 2 579 684 A1 | 4/2012 |
| EP | 2515611 A1 | 10/2012 |
| WO | WO 2008/011041 A2 | 1/2008 |
| WO | WO 2015070099 A1 | 5/2015 |

\* cited by examiner

LOAD CONTROL DEVICE FOR A LIGHT-EMITTING DIODE LIGHT SOURCE

CROSS-REFERENCE TO RELATED APPLICATIONS

This application is a continuation of U.S. patent application Ser. No. 15/583,425, filed May 1, 2017, now U.S. Pat. No. 10,104,735 B2, which is a continuation of U.S. patent application Ser. No. 15/186,254, filed Jun. 17, 2016, now U.S. Pat. No. 9,655,180, issued on May 16, 2017, which claims the benefit of Provisional U.S. Patent Application No. 62/182,110, filed Jun. 19, 2015, the disclosure of which is incorporated herein by reference in its entirety.

BACKGROUND

Light-emitting diode (LED) light sources (i.e., LED light engines) are often used in place of or as replacements for conventional incandescent, fluorescent, or halogen lamps, and the like. LED light sources may comprise a plurality of light-emitting diodes mounted on a single structure and provided in a suitable housing. LED light sources are typically more efficient and provide longer operational lives as compared to incandescent, fluorescent, and halogen lamps. In order to illuminate properly, an LED driver control device (i.e., an LED driver) must be coupled between an alternating-current (AC) source and the LED light source for regulating the power supplied to the LED light source. The LED driver may regulate either the voltage provided to the LED light source to a particular value, the current supplied to the LED light source to a specific peak current value, or may regulate both the current and voltage.

LED light sources are typically rated to be driven via one of two different control techniques: a current load control technique or a voltage load control technique. An LED light source that is rated for the current load control technique is also characterized by a rated current (e.g., approximately 350 milliamps) to which the peak magnitude of the current through the LED light source should be regulated to ensure that the LED light source is illuminated to the appropriate intensity and color. In contrast, an LED light source that is rated for the voltage load control technique is characterized by a rated voltage (e.g., approximately 15 volts) to which the voltage across the LED light source should be regulated to ensure proper operation of the LED light source. Typically, each string of LEDs in an LED light source rated for the voltage load control technique includes a current balance regulation element to ensure that each of the parallel legs has the same impedance so that the same current is drawn in each parallel string.

It is known that the light output of an LED light source can be dimmed. Different methods of dimming LEDs include a pulse-width modulation (PWM) technique and a constant current reduction (CCR) technique. Pulse-width modulation dimming can be used for LED light sources that are controlled in either a current or voltage load control mode/technique. In pulse-width modulation dimming, a pulsed signal with a varying duty cycle is supplied to the LED light source. If an LED light source is being controlled using the current load control technique, the peak current supplied to the LED light source is kept constant during an on time of the duty cycle of the pulsed signal. However, as the duty cycle of the pulsed signal varies, the average current supplied to the LED light source also varies, thereby varying the intensity of the light output of the LED light source. If the LED light source is being controlled using the voltage load control technique, the voltage supplied to the LED light source is kept constant during the on time of the duty cycle of the pulsed signal in order to achieve the desired target voltage level, and the duty cycle of the load voltage is varied in order to adjust the intensity of the light output. Constant current reduction dimming is typically only used when an LED light source is being controlled using the current load control technique. In constant current reduction dimming, current is continuously provided to the LED light source, however, the DC magnitude of the current provided to the LED light source is varied to thus adjust the intensity of the light output. Examples of LED drivers are described in greater detail in commonly-assigned U.S. Pat. No. 8,492,987, issued Jul. 23, 2010, and U.S. Patent Application Publication No. 2013/0063047, published Mar. 14, 2013, both entitled LOAD CONTROL DEVICE FOR A LIGHT-EMITTING DIODE LIGHT SOURCE, the entire disclosures of which are hereby incorporated by reference.

Dimming an LED light source using traditional techniques may result in changes in light intensity that are perceptible to the human vision. This problem may be more apparent if the dimming occurs while the LED light source is near the low end of its intensity range (e.g., below 5% of a maximum intensity). Accordingly, systems, methods, and instrumentalities for fine-tuning the intensity of an LED light source may be desirable.

SUMMARY

As described herein, a load control device for controlling the amount of power delivered to an electrical load may be able to adjust the average magnitude of a load current conducted through the electrical load. The load control device may comprise a load regulation circuit that is configured to control the magnitude of the load current to control the amount of power delivered to the electrical load. The load control device may comprise an inverter circuit characterized by an operating period. The load control device may further comprise a control circuit coupled to the load regulation circuit and configured to adjust an on time of the inverter circuit to control an average magnitude of the load current. The control circuit may be configured to operate in a normal mode and a burst mode. The burst mode may comprise an active state during an active state period of a burst mode period and an inactive state during an inactive state period of the burst mode period. During the normal mode, the control circuit may be configured to regulate the average magnitude of the load current by holding the active state and inactive state periods of the burst mode period constant and adjusting a target load current. During the burst mode, the control circuit may be configured to regulate the average magnitude of the load current by adjusting the lengths of the active state and inactive state periods of the burst mode period. During the burst mode, the control circuit may be configured to adjust the operating period of the inverter circuit by adjusting the on time of the inverter circuit until the on time is less than or equal to a minimum on time. During the normal mode, the control circuit may be configured to control the operating period of the inverter circuit between the adjusted low-end operating period and a high-end operating period, for example as a function of the load current.

The control circuit may be configured to adjust the operating period of the inverter circuit even if the control circuit is not configured to operate in the burst mode. The control circuit may adjust the operating period of the inverter circuit by adjusting the on time of the inverter circuit when a target load current is near or below a low-end transition value. The adjustment may be made until the on time of the inverter circuit is less than or equal to a minimum on time. When the target load current is greater than or equal to the low-end transition value, the control circuit may adjust the operating period of the inverter circuit between the adjusted low-end operating period and a high-end operating period, for example as a function of the load current.

DETAILED DESCRIPTION

Figure 1:
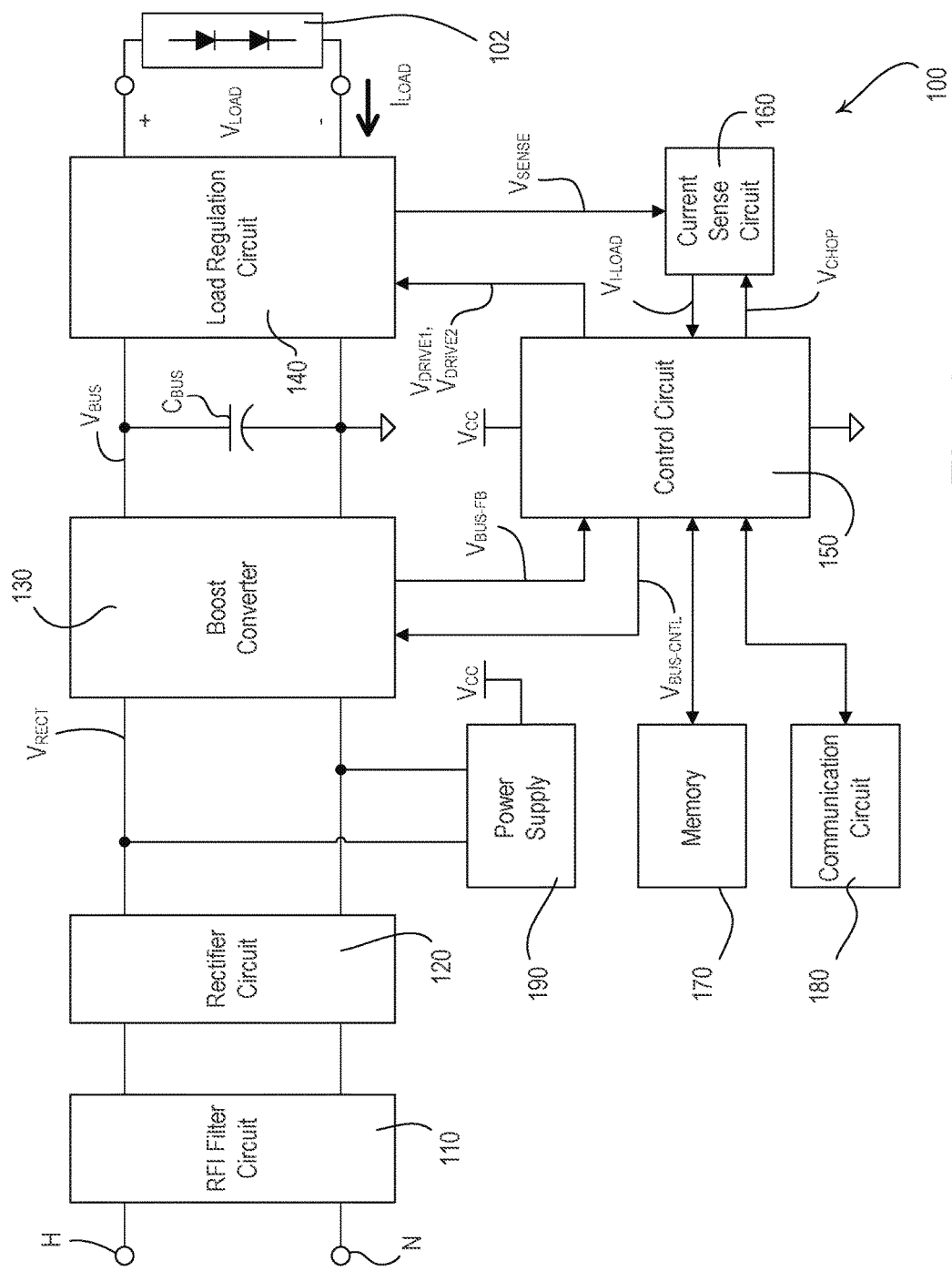
FIG. 1 is a simplified block diagram of a light-emitting diode (LED) driver for controlling the intensity of an LED light source.

FIG. 1 is a simplified block diagram of a load control device, e.g., a light-emitting diode (LED) driver 100, for controlling the amount of power delivered to an electrical load, such as, an LED light source 102 (e.g., an LED light engine), and thus the intensity of the electrical load. The LED light source 102 is shown as a plurality of LEDs connected in series but may comprise a single LED or a plurality of LEDs connected in parallel or a suitable combination thereof, depending on the particular lighting system. The LED light source 102 may comprise one or more organic light-emitting diodes (OLEDs). The LED driver 100 may comprise a hot terminal H and a neutral terminal that are adapted to be coupled to an alternating-current (AC) power source (not shown).

The LED driver 100 may comprise a radio-frequency (RFI) filter circuit 110, a rectifier circuit 120, a boost converter 130, a load regulation circuit 140, a control circuit 150, a current sense circuit 160, a memory 170, a communication circuit 180, and/or a power supply 190. The RFI filter circuit 110 may minimize the noise provided on the AC mains. The rectifier circuit 120 may generate a rectified voltage $V_{RECT}$.

The boost converter 130 may receive the rectified voltage $V_{RECT}$ and generate a boosted direct-current (DC) bus voltage $V_{BUS}$ across a bus capacitor $C_{BUS}$. The boost converter 130 may comprise any suitable power converter circuit for generating an appropriate bus voltage, such as, for example, a flyback converter, a single-ended primary-inductor converter (SEPIC), a Ćuk converter, or other suitable power converter circuit. The boost converter 120 may operate as a power factor correction (PFC) circuit to adjust the power factor of the LED driver 100 towards a power factor of one.

The load regulation circuit 140 may receive the bus voltage $V_{BUS}$ and control the amount of power delivered to the LED light source 102, for example, to control the intensity of the LED light source 102 between a low-end (i.e., minimum) intensity $L_{LE}$ (e.g., approximately 1-5%) and a high-end (i.e., maximum) intensity $L_{HE}$ (e.g., approximately 100%). An example of the load regulation circuit 140 may be an isolated, half-bridge forward converter. An example of the load control device (e.g., LED driver 100) comprising a forward converter is described in greater detail in commonly-assigned U.S. patent application Ser. No. 13/935,799, filed Jul. 5, 2013, entitled LOAD CONTROL DEVICE FOR A LIGHT-EMITTING DIODE LIGHT SOURCE, the entire disclosure of which is hereby incorporated by reference. The load regulation circuit 140 may comprise, for example, a buck converter, a linear regulator, or any suitable LED drive circuit for adjusting the intensity of the LED light source 102.

The control circuit 150 may be configured to control the operation of the boost converter 130 and/or the load regulation circuit 140. An example of the control circuit 150 may be a controller. The control circuit 150 may comprise, for example, a digital controller or any other suitable processing device, such as, for example, a microcontroller, a programmable logic device (PLD), a microprocessor, an application specific integrated circuit (ASIC), or a field-programmable gate array (FPGA). The control circuit 150 may generate a bus voltage control signal $V_{BUS-CNTL}$, which may be provided to the boost converter 130 for adjusting the magnitude of the bus voltage $V_{BUS}$. The control circuit 150 may receive a bus voltage feedback control signal $V_{BUS-FB}$ from the boost converter 130, which may indicate the magnitude of the bus voltage $V_{BUS}$.

The control circuit 150 may generate drive control signals $V_{DRIVE1}$, $V_{DRIVE2}$. The drive control signals $V_{DRIVE1}$, $V_{DRIVE2}$ may be provided to the load regulation circuit 140 for adjusting the magnitude of a load voltage $V_{LOAD}$ generated across the LED light source 102 and the magnitude of a load current $I_{LOAD}$ conducted through the LED light source 120, for example, to control the intensity of the LED light source 120 to a target intensity $L_{TRGT}$. The control circuit 150 may adjust an operating frequency fop and/or a duty cycle $DCT_{INV}$ (e.g., an on time $T_{ON}$) of the drive control signals $V_{DRIVE1}$, $V_{DRIVE2}$ to adjust the magnitude of the load voltage $V_{LOAD}$ and/or the load current $I_{LOAD}$.

The current sense circuit 160 may receive a sense voltage $V_{SENSE}$ generated by the load regulation circuit 140. The sense voltage $V_{SENSE}$ may indicate the magnitude of the load current $I_{LOAD}$. The current sense circuit 160 may receive a signal-chopper control signal $V_{CHOP}$ from the control circuit 150. The current sense circuit 160 may generate a load current feedback signal $V_{I-LOAD}$, which may be a DC voltage indicating the average magnitude $I_{AVE}$ of the load current $I_{LOAD}$. The control circuit 150 may receive the load current feedback signal $V_{I-LOAD}$ from the current sense circuit 160 and control the drive control signals $V_{DRIVE1}$, $V_{DRIVE2}$ accordingly. For example, the control circuit 150 may control the drive control signals $V_{DRIVE1}$, $V_{DRIVE2}$ to adjust a magnitude of the load current $I_{LOAD}$ to a target load current $I_{TRGT}$ to thus control the intensity of the LED light source 102 to the target intensity $L_{TRGT}$ (e.g., using a control loop).

Figure 2:
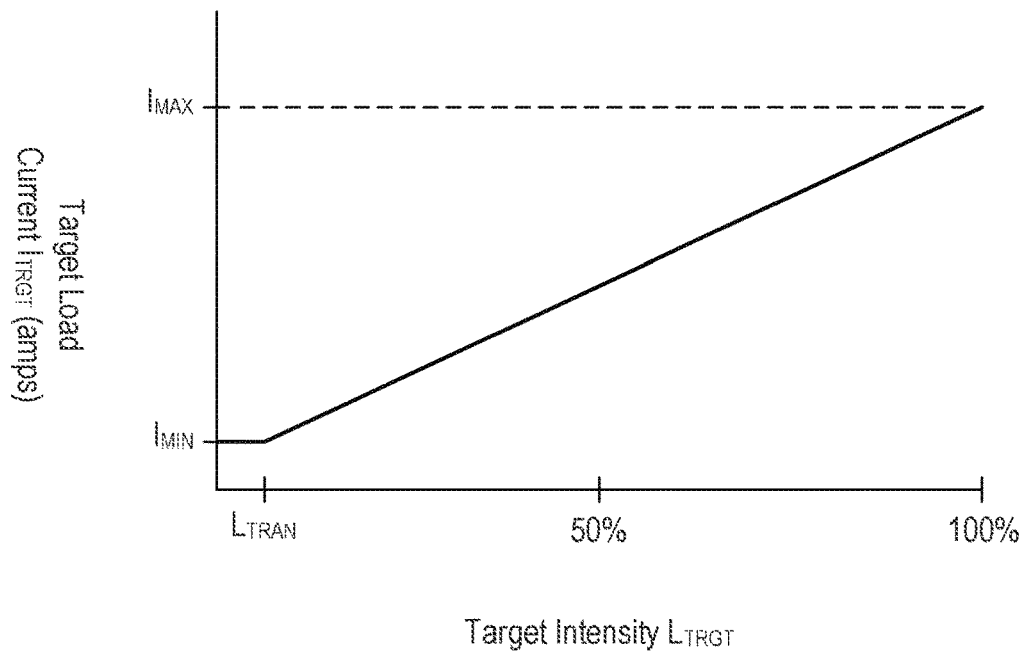
FIG. 2 is an example plot of a target load current of the LED driver of FIG. 1 as a function of a target intensity.
Figure 13:
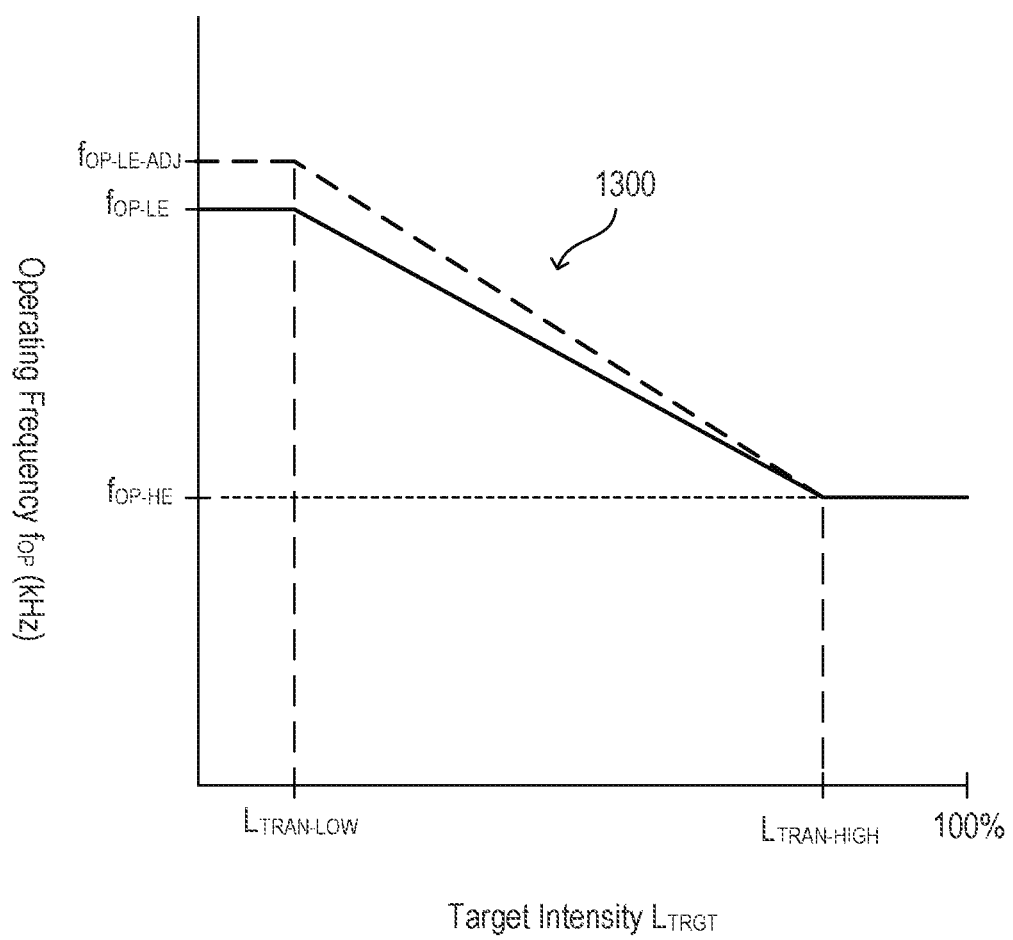
FIG. 13 is an example plot of an operating frequency of an LED driver as a function of a target intensity.

The load current $I_{LOAD}$ may be the current that is conducted through the LED light source 120. The target load current $I_{TRGT}$ may be the current that the control circuit 150 would ideally like to conduct through the LED light source 120 (e.g., based at least on the load current feedback signal $V_{I-LOAD}$). The control circuit 150 may be limited to specific levels of granularity in which it can control the current conducted through the LED light source 120 (e.g., due to inverter cycle lengths, etc.), so the control circuit 150 may not always be able to achieve the target load current $I_{TRGT}$. For example, FIGS. 2 and 13 illustrate the current conducted through an LED light source as a linear graph (at least in parts), and as such, illustrate the target load current $I_{TRGT}$ since the load current $I_{LOAD}$ itself may not actually follow a true linear path. Further, non-ideal reactions of the LED light source 120 (e.g., an overshoot in the load current $I_{LOAD}$, for example, as shown in FIG. 14A) may cause the load current $I_{LOAD}$ to deviate from the target load current $I_{TRGT}$. In the ideal situation, the load current $I_{LOAD}$ is approximately equal to the target load current $I_{TRGT}$.

The control circuit 150 may be coupled to the memory 170. The memory 170 may store operational characteristics of the LED driver 100 (e.g., the target intensity $L_{TRGT}$, the low-end intensity $L_{LE}$, the high-end intensity LHE, etc.). The communication circuit 180 may be coupled to, for example, a wired communication link or a wireless communication link, such as a radio-frequency (RF) communication link or an infrared (IR) communication link. The control circuit 150 may be configured to update the target intensity $L_{TRGT}$ of the LED light source 102 and/or the operational characteristics stored in the memory 170 in response to digital messages received via the communication circuit 180. The LED driver 100 may be operable to receive a phase-control signal from a dimmer switch for determining the target intensity $L_{TRGT}$ for the LED light source 102. The power supply 190 may receive the rectified voltage $V_{RECT}$ and generate a direct-current (DC) supply voltage $V_{CC}$ for powering the circuitry of the LED driver 100.

FIG. 2 is an example plot of the target load current $I_{TRGT}$ as a function of the target intensity $L_{TRGT}$. The magnitude of the load current $I_{LOAD}$ may only be regulated to values between a maximum rated current $I_{MAX}$ and a minimum rated current $I_{MIN}$, for example, due to hardware limitations of the load regulation circuit 140 and the control circuit 150. Thus, the target load current $I_{TRGT}$ may only be adjusted between the maximum rated current $I_{MAX}$ and the minimum rated current $I_{MIN}$. When the target intensity $L_{TRGT}$ is between the high-end intensity $L_{HE}$ (e.g., approximately 100%) and a transition intensity $L_{TRAN}$ (e.g., approximately 5%), the control circuit 150 may operate the load regulation circuit 140 in a normal mode in which an average magnitude $I_{AVE}$ of the load current $I_{LOAD}$ is controlled to be equal to the target load current $I_{TRGT}$. In the normal mode, the control circuit 150 may adjust the average magnitude $I_{AVE}$ of the load current $I_{LOAD}$ to the target load current $I_{TRGT}$ in response to the load current feedback signal $V_{I-LOAD}$, e.g., using closed loop control. The control circuit 150 may adjust the target load current $I_{TRGT}$ between the maximum rated current IMAX and the minimum rated current $I_{MIN}$ in the normal mode, for example, as shown in FIG. 2.

Figure 3:
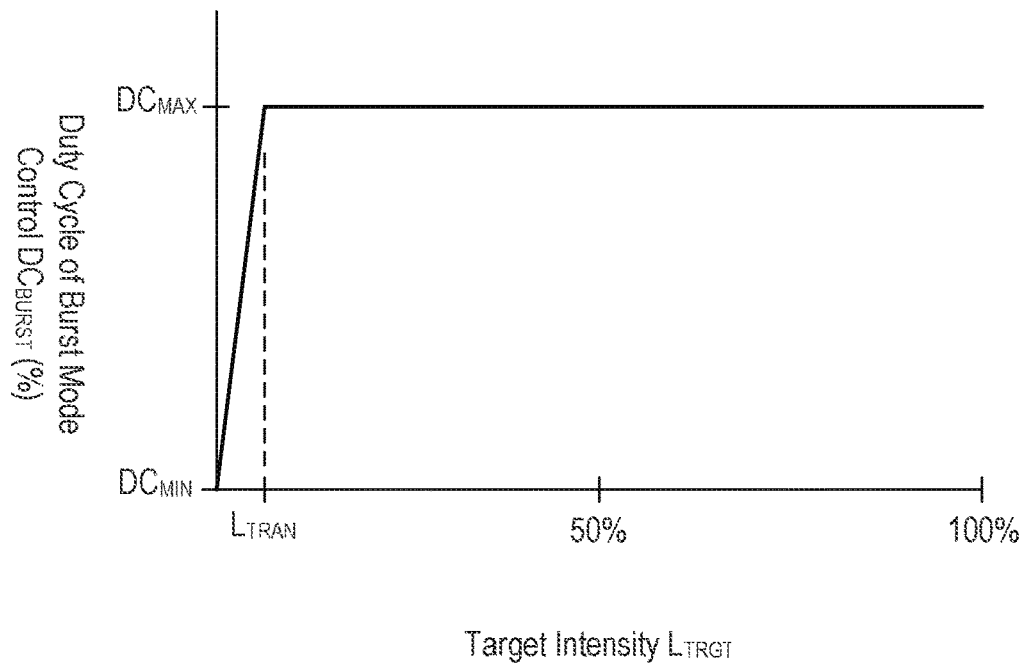
FIG. 3 is an example plot of a burst duty cycle of the LED driver of FIG. 1 as a function of the target intensity.

FIG. 3 is an example plot of a burst duty cycle $DC_{BURST}$ (e.g., an ideal burst duty cycle $DC_{BURST-IDEAL}$) as a function of the target intensity $L_{TRGT}$. When the target intensity $L_{TRGT}$ is between the high-end intensity $L_{HE}$ (e.g., approximately 100%) and a transition intensity $L_{TRAN}$ (e.g., approximately 5%), the control circuit 150 may be configured to operate the load regulation circuit 140 to set the burst duty cycle $DC_{BURST}$ equal to a maximum duty cycle $DC_{MAX}$ (e.g., approximately 100%). To adjust the target intensity $L_{TRGT}$ below the transition intensity $L_{TRAN}$, the control circuit 150 may be configured to operate the load regulation circuit 140 in a burst mode to reduce the average magnitude $I_{AVE}$ of the load current $I_{LOAD}$ to be less the minimum rated current $I_{MIN}$. For example, to adjust the target intensity $L_{TRGT}$ below the transition intensity $L_{TRAN}$, the control circuit 150 may be configured to operate the load regulation circuit 140 to reduce the burst duty cycle $DC_{BURST}$ below the maximum duty cycle $DC_{MAX}$. For example, the load regulation circuit 140 may adjust the burst duty cycle $DC_{BURST}$ between the maximum duty cycle $DC_{MAX}$ (e.g., approximately 100%) and a minimum duty cycle $DC_{MIN}$ (e.g., approximately 20%). In the burst mode, a peak magnitude $I_{PK}$ of the load current $I_{LOAD}$ may be equal to the target current $I_{TRGT}$ (e.g., the minimum rated current $I_{MIN}$). For example, the peak magnitude $I_{PK}$ of the load current $I_{LOAD}$ may be equal to the minimum rated current $I_{MIN}$ during an active state of the burst mode.

With reference to FIG. 3, the burst duty cycle $DC_{BURST}$ may refer to an ideal burst duty cycle $DC_{BURST-IDEAL}$, which may include an integer portion $DC_{BURST-INTEGER}$ and/or a fractional portion $DC_{BURST-FRACTIONAL}$. The integer portion $DC_{BURST-INTEGER}$ may be characterized by the percentage of the ideal burst duty cycle $DC_{BURST-IDEAL}$ that includes complete inverter cycles (i.e., an integer value of inverter cycles). The fractional portion $DC_{BURST-FRACTIONAL}$ may be characterized by the percentage of the ideal burst duty cycle $DC_{BURST-IDEAL}$ that includes a fraction of an inverter cycle. As described herein, the control circuit 150 (e.g., via the load regulation circuit 140) may be configured to adjust the number of inverter cycles only by an integer number (i.e., by $DC_{BURST-INTEGER}$) and not a fractional amount (i.e., $DC_{BURST-FRACTIONAL}$). Therefore, the example plot of FIG. 3 may illustrate an ideal curve showing the adjustment of the ideal burst duty cycle $DC_{BURST-IDEAL}$ from a maximum duty cycle $DC_{MAX}$ to a minimum duty cycle $DC_{MIN}$ when the target intensity $L_{TRGT}$ is below the transition intensity $L_{TRAN}$. Nonetheless, unless defined differently, burst duty cycle $DC_{BURST}$ may refer to the integer portion $DC_{BURST-INTEGER}$ of the ideal burst duty cycle $DC_{BURST-IDEAL}$, for example, if the control circuit 150 is not be configured to operate the burst duty cycle $DC_{BURST}$ at fractional amounts.

Figure 4:
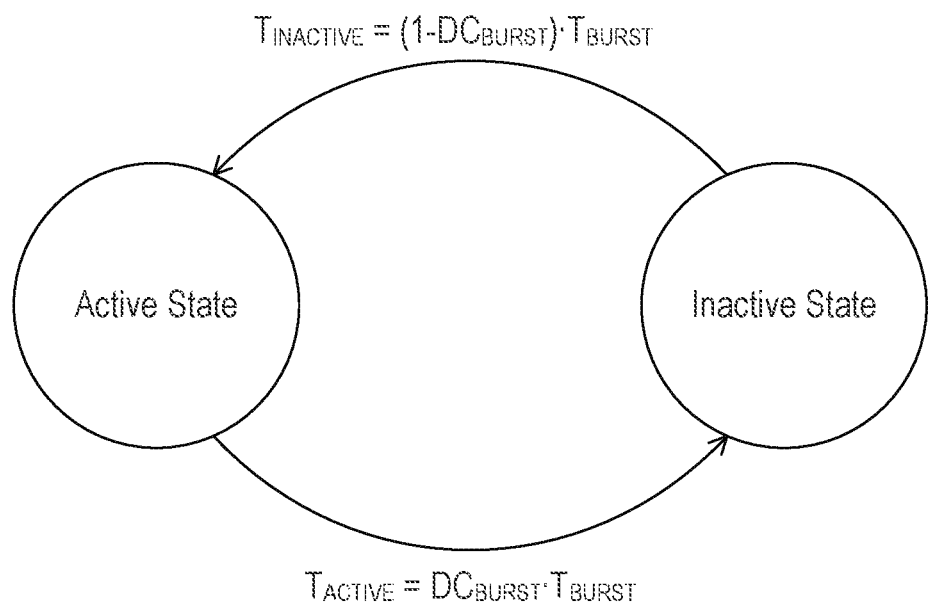
FIG. 4 is an example state diagram illustrating the operation of a load regulation circuit of the LED driver of FIG. 1 when operating in a burst mode.

FIG. 4 is an example state diagram illustrating the operation of the load regulation circuit 140 in the burst mode. During the burst mode, the control circuit 150 may periodically control the load regulation circuit 140 into an active state and an inactive state, e.g., in dependence upon a burst duty cycle $DC_{BURST}$ and a burst mode period $T_{BURST}$ (e.g., approximately 4.4 milliseconds). For example, the active state period ($T_{ACTIVE}$) may be equal to the burst duty cycle ($DC_{BURST}$) times the burst mode period ($T_{BURST}$) and the inactive state period ($T_{INACTIVE}$) may be equal to one minus the burst duty cycle ($DC_{BURST}$) times the burst mode period ($T_{BURST}$). That is, $T_{ACTIVE}=DC_{BURST} \cdot T_{BURST}$ and $T_{INACTIVE}=(1-DC_{BURST}) \cdot T_{BURST}$.

In the active state of the burst mode, the control circuit 150 may generate (e.g., actively generate) the drive control signals $V_{DRIVE1}$, $V_{DRIVE2}$ to adjust the magnitude (e.g., the peak magnitude $I_{PK}$) of the load current $I_{LOAD}$, e.g., using closed loop control. For example, in the active state of the burst mode, the control circuit 150 may generate the drive signals $V_{DRIVE1}$, $V_{DRIVE2}$ to adjust the magnitude of the load current $I_{LOAD}$ to be equal to a target load current $I_{TRGT}$ (e.g., the minimum rated current $I_{MIN}$) in response to the load current feedback signal $V_{I-LOAD}$.

In the inactive state of the burst mode, the control circuit 150 may freeze the control loop and may not generate the drive control signals $V_{DRIVE1}$, $V_{DRIVE2}$, for example, such that the magnitude of the load current $I_{LOAD}$ drops to approximately zero amps. While the control loop is frozen (e.g., in the inactive state), the control circuit 150 may not adjust the values of the operating frequency fop and/or the duty cycle $DC_{INV}$ in response to the load current feedback signal $V_{I-LOAD}$ (e.g., even though the control circuit 150 is not presently generating the drive signals $V_{DRIVE1}$, $V_{DRIVE2}$). For example, the control circuit 150 may store the present duty cycle $DC_{INV}$ (e.g., the present on time $T_{ON}$) of the drive control signals $V_{DRIVE1}$, $V_{DRIVE2}$ in the memory 170 prior to (e.g., immediately prior to) freezing the control loop. Accordingly, when the control loop is unfrozen (e.g., when the control circuit 150 enters the active state), the control circuit 150 may continue to generate the drive control signals $V_{DRIVE1}$, $V_{DRIVE2}$ using the operating frequency fop and/or the duty cycle $DC_{INV}$ from the previous active state.

The control circuit 150 may be configured to adjust the burst duty cycle $DC_{BURST}$ using an open loop control. For example, the control circuit 150 may be configured to adjust the burst duty cycle $DC_{BURST}$ as a function of the target intensity $L_{TRGT}$, for example, when the target intensity $L_{TRGT}$ is below the transition intensity $L_{TRAN}$. The control circuit 150 may be configured to linearly decrease the burst duty cycle $DC_{BURST}$ as the target intensity $L_{TRGT}$ is decreased below the transition intensity $L_{TRAN}$ (e.g., as shown in FIG. 3), while the target load current $I_{TRGT}$ is held constant at the minimum rated current $I_{MIN}$ (e.g., as shown in FIG. 2). Since the control circuit 150 changes between the active state and the inactive state in dependence upon the burst duty cycle $DC_{BURST}$ and the burst mode period $T_{BURST}$ (e.g., as shown in the state diagram of FIG. 4), the average magnitude $I_{AVE}$ of the load current $I_{LOAD}$ may be a function of the burst duty cycle $DC_{BURST}$ (e.g., $I_{AVE}=DC_{BURST} \cdot I_{MIN}$). During the burst mode, the peak magnitude $I_{PK}$ of the load current $I_{LOAD}$ may be equal to the minimum rated current $I_{MIN}$, but the average magnitude $I_{AVE}$ of the load current $I_{LOAD}$ may be less than the minimum rated current $I_{MIN}$.

Figure 5:
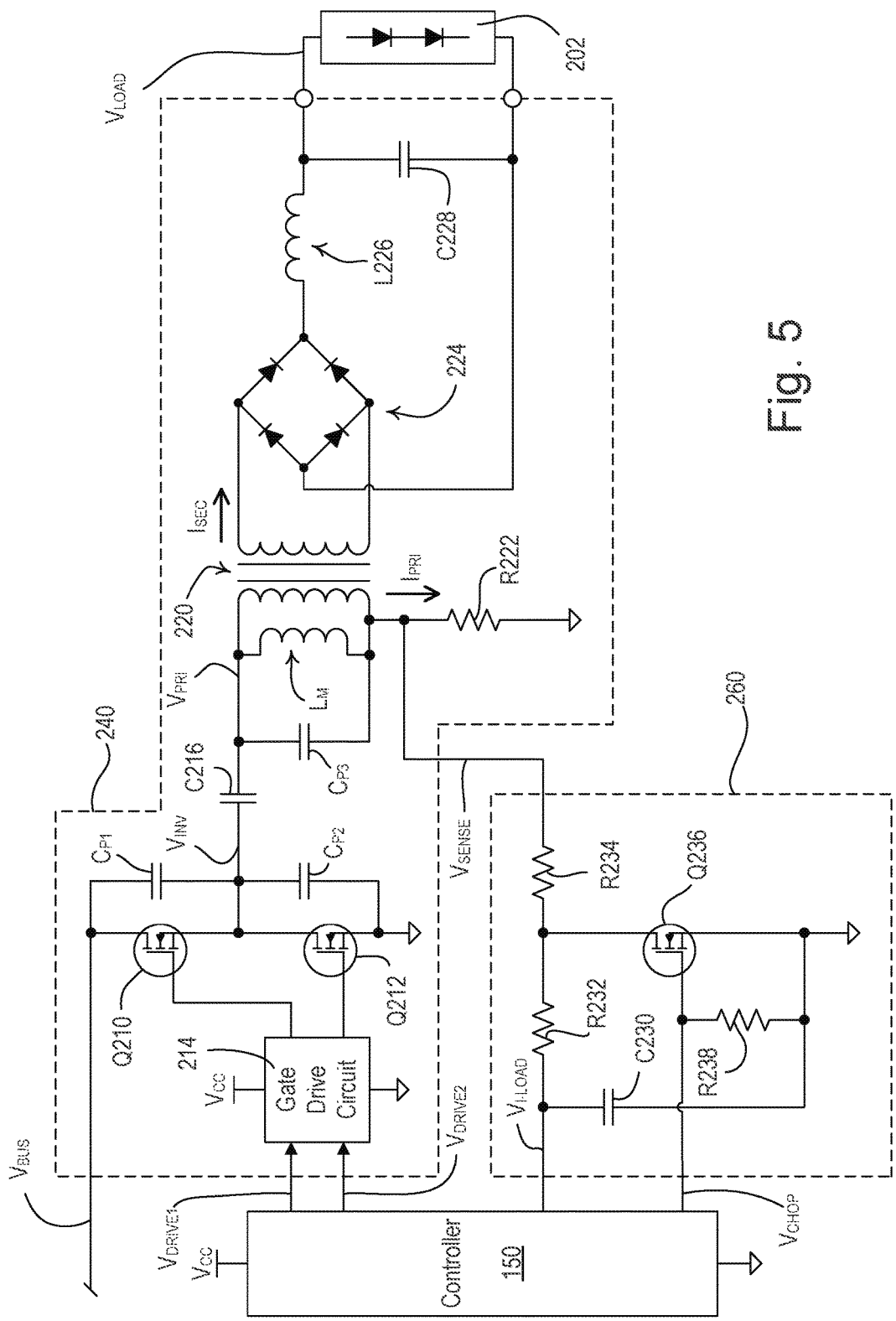
FIG. 5 is a simplified schematic diagram of an isolated forward converter and a current sense circuit of an LED driver.

FIG. 5 is a simplified schematic diagram of a forward converter 240 and a current sense circuit 260 of an LED driver (e.g., the LED driver 100 shown in FIG. 1). The forward converter 240 may be an example of the load regulation circuit 140 of the LED driver 100 shown in FIG. 1. The current sense circuit 260 may be an example of the current sense circuit 160 of the LED driver 100 shown in FIGS. 1.

The forward converter 240 may comprise a half-bridge inverter circuit having two field effect transistors (FETs) Q210, Q212 for generating a high-frequency inverter voltage $V_{INV}$ from the bus voltage $V_{BUS}$. The FETs Q210, Q212 may be rendered conductive and non-conductive in response to the drive control signals $V_{DRIVE1}$, $V_{DRIVE2}$. The drive control signals $V_{DRIVE1}$, $V_{DRIVE2}$ may be received from the control circuit 150. The drive control signals $V_{DRIVE1}$, $V_{DRIVE2}$ may be coupled to the gates of the respective FETs Q210, Q212 via a gate drive circuit 214 (e.g., which may comprise part number L6382DTR, manufactured by ST Microelectronics). The control circuit 150 may generate the inverter voltage $V_{INV}$ at a constant operating frequency fop (e.g., approximately 60-65 kHz) and thus a constant operating period $T_{OP}$. However, the operating frequency fop and/or operating period $T_{OP}$ may be adjusted under certain operating conditions. For example, the operating frequency $f_{OP}$ may be adjusted (e.g., increased or decreased) as the target intensity $L_{TRGT}$ of the LED light source 202 is adjusted towards the high-end intensity $L_{HE}$ (e.g., as shown in FIG. 13). For example, the operating frequency fop may be adjusted (e.g., increased or decreased) as the target intensity $L_{TRGT}$ of the LED light source 202 is adjusted towards the transition intensity $L_{TRAN}$. The control circuit 150 may be configured to adjust a duty cycle $DC_{INV}$ of the inverter voltage $V_{INV}$ control the intensity of an LED light source 202 towards the target intensity $L_{TRGT}$.

In a normal mode of operation, when the target intensity $L_{TRGT}$ of the LED light source 202 is between the high-end intensity $L_{HE}$ and the transition intensity $L_{TRAN}$, the control circuit 150 may adjust the duty cycle $DC_{INV}$ of the inverter voltage $V_{INV}$ to adjust the magnitude (e.g., the average magnitude $I_{AVE}$) of the load current $I_{LOAD}$ towards the target load current $I_{TRGT}$. As previously mentioned, the magnitude of the load current $I_{LOAD}$ may vary between the maximum rated current $I_{MAX}$ and the minimum rated current $I_{MIN}$ (e.g., as shown in FIG. 2). For example, the minimum rated current $I_{MIN}$ may be chosen based on a minimum on time $T_{ON-MIN}$ of the half-bridge inverter circuit of the forward converter 240. The value of the minimum on time $T_{ON-MIN}$ may be set such that the on time of the half-bridge inverter circuit may be maintained within thehardware limitations of the forward converter. At the minimum rated current $I_{MIN}$ (e.g., at the transition intensity $L_{TRAN}$), the inverter voltage $V_{INV}$ may be characterized by a low-end operating frequency $f_{OP-LE}$ and a low-end operating period $T_{OP-LE}$.

When the target intensity $L_{TRGT}$ of the LED light source 202 is below the transition intensity $L_{TRAN}$, the control circuit 150 may be configured to operate the forward converter 240 in a burst mode of operation. The control circuit 150 may use power (e.g., a transition power) and/or current (e.g., a transition current) as a threshold to determine when to operate in the burst mode (e.g., instead of intensity). In the burst mode of operation, the control circuit 150 may be configured to switch the forward converter 240 between an active mode (e.g., in which the control circuit 150 actively generates the drive control signals $V_{DRIVE1}$, $V_{DRIVE2}$ to regulate the peak magnitude $I_{PK}$ of the load current $I_{LOAD}$ to be equal to the minimum rated current $I_{MIN}$) and an inactive mode (e.g., in which the control circuit 150 freezes the control loop and does not generate the drive control signals $V_{DRIVE1}$, $V_{DRIVE2}$), for example, as shown in the state diagram of FIG. 4. In the burst mode, the control circuit 150 may change the forward converter 240 between the active state and the inactive state in dependence upon a burst duty cycle $DC_{BURST}$ and a burst mode period $T_{BURST}$ (e.g., as shown in FIG. 4) and adjust the burst duty cycle $DC_{BURST}$ as a function of the target intensity $L_{TRGT}$, which is below the transition intensity $L_{TRAN}$ (e.g., as shown in FIG. 3). In the normal mode and in the active state of the burst mode, the forward converter 240 may be characterized by a turn-on time $T_{TURN-ON}$ and a turn-off time $T_{TURN-OFF}$. The turn-on time $T_{TURN-ON}$ may be a time period from when the drive control signals $V_{DRIVE1}$, $V_{DRIVE2}$ are driven until the respective FET Q210, Q212 is rendered conductive. The turn-off time $T_{TURN-OFF}$ may be a time period from when the drive control signals $V_{DRIVE1}$, $V_{DRIVE2}$ are driven until the respective FET Q210, Q212 is rendered non-conductive.

The inverter voltage $V_{INV}$ is coupled to the primary winding of a transformer 220 through a DC-blocking capacitor C216 (e.g., which may have a capacitance of approximately 0.047 µF), such that a primary voltage $V_{PRI}$ is generated across the primary winding. The transformer 220 may be characterized by a turns ratio $n_{TURNS}$ (i.e., $N_1/N_2$), which may be approximately 115:29. A sense voltage $V_{SENSE}$ may be generated across a sense resistor R222, which may be coupled in series with the primary winding of the transformer 220. The FETs Q210, Q212 and the primary winding of the transformer 220 may be characterized by parasitic capacitances $C_{P1}$, $C_{P2}$, $C_{P3}$, respectively. The secondary winding of the transformer 220 may generate a secondary voltage. The secondary voltage may be coupled to the AC terminals of a full-wave diode rectifier bridge 224 for rectifying the secondary voltage generated across the secondary winding. The positive DC terminal of the rectifier bridge 224 may be coupled to the LED light source 202 through an output energy-storage inductor L226 (e.g., which may have an inductance of approximately 10 mH), such that the load voltage $V_{LOAD}$ may be generated across an output capacitor C228 (e.g., which may have a capacitance of approximately 3 µF).

The current sense circuit 260 may comprise an averaging circuit for producing the load current feedback signal $V_{I-LOAD}$. The averaging circuit may comprise a low-pass filter comprising a capacitor C230 (e.g., which may have a capacitance of approximately 0.066 uF) and a resistor R232 (e.g., which may have a resistance of approximately 3.32 kΩ). The low-pass filter may receive the sense voltage $V_{SENSE}$ via a resistor R234 (e.g., which may have a resistance of approximately 1 kΩ). The current sense circuit 160 may comprise a transistor Q236 (e.g., a FET as shown in FIG. 5) coupled between the junction of the resistors R232, R234 and circuit common. The gate of the transistor Q236 may be coupled to circuit common through a resistor R238 (e.g., which may have a resistance of approximately 22 kΩ). The gate of the transistor Q236 may receive the signal-chopper control signal $V_{CHOP}$ from the control circuit 150. An example of the current sense circuit 260 may be described in greater detail in commonly-assigned U.S. patent application Ser. No. 13/834,153, filed Mar. 15, 2013, entitled FORWARD CONVERTER HAVING A PRIMARY-SIDE CURRENT SENSE CIRCUIT, the entire disclosure of which is hereby incorporated by reference.

Figure 6:
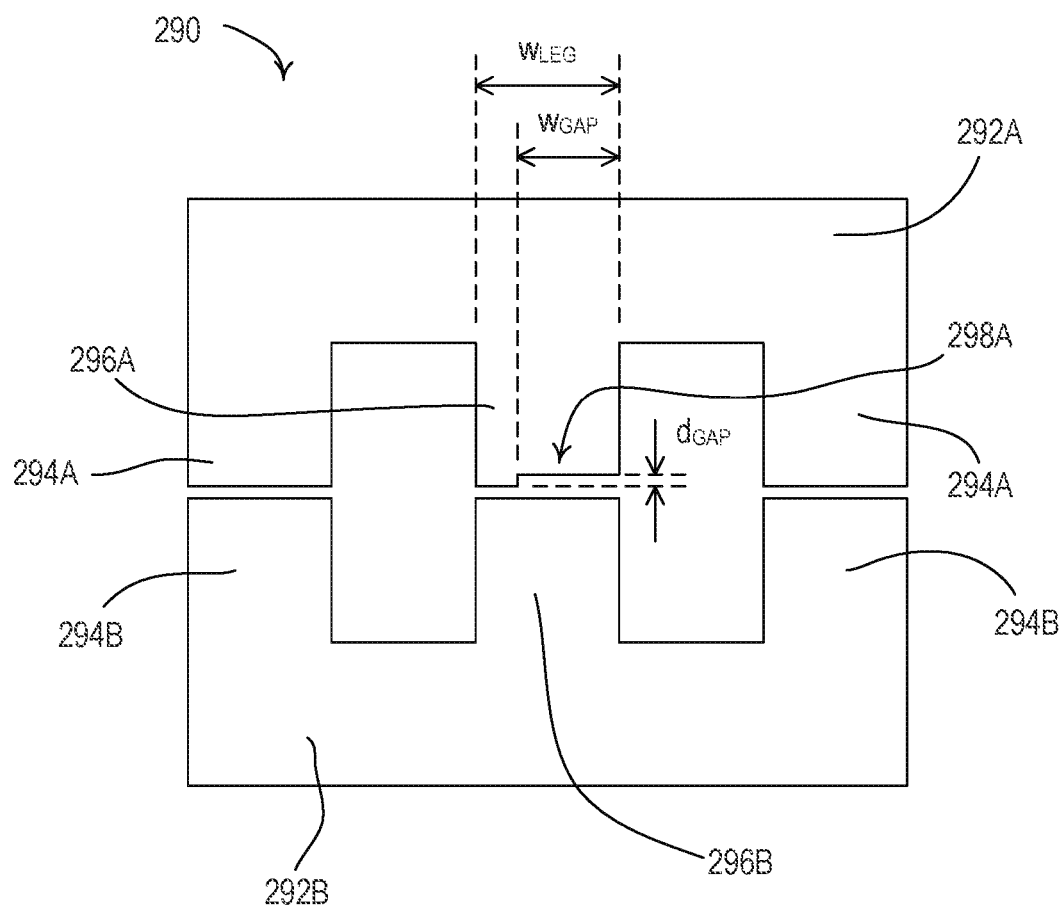
FIG. 6 is an example diagram illustrating a magnetic core set of an energy-storage inductor of a forward converter.

FIG. 6 is an example diagram illustrating a magnetic core set 290 of an energy-storage inductor (e.g., the output energy-storage inductor L226 of the forward converter 240 shown in FIG. 5). The magnetic core set 290 may comprise two E-cores 292A, 292B, and may comprise part number PC40EE16-Z, manufactured by TDK Corporation. The E-cores 292A, 292B may comprise respective outer legs 294A, 294B and inner legs 296A, 296B. Each inner leg 296A, 296B may be characterized by a width wLEG (e.g., approximately 4 mm). The inner leg 296A of the first E-core 292A may comprise a partial gap 298A (i.e., the magnetic core set 290 is partially-gapped), such that the inner legs 296A, 296B are spaced apart by a gap distance dGAP (e.g., approximately 0.5 mm). The partial gap 298A may extend for a gap width $W_{GAP}$ (e.g., approximately 2.8 mm) such that the partial gap 298A extends for approximately 70% of the leg width WLEG of the inner leg 296A. In one or more embodiments, both of the inner legs 296A, 296B may comprise partial gaps. The partially-gapped magnetic core set 290 (e.g., as shown in FIG. 6) may allow the output energy-storage inductor L226 of the forward converter 240 (e.g., shown in FIG. 5) to maintain continuous current at low load conditions (e.g., near the low-end intensity $L_{LE}$).

Figure 7:
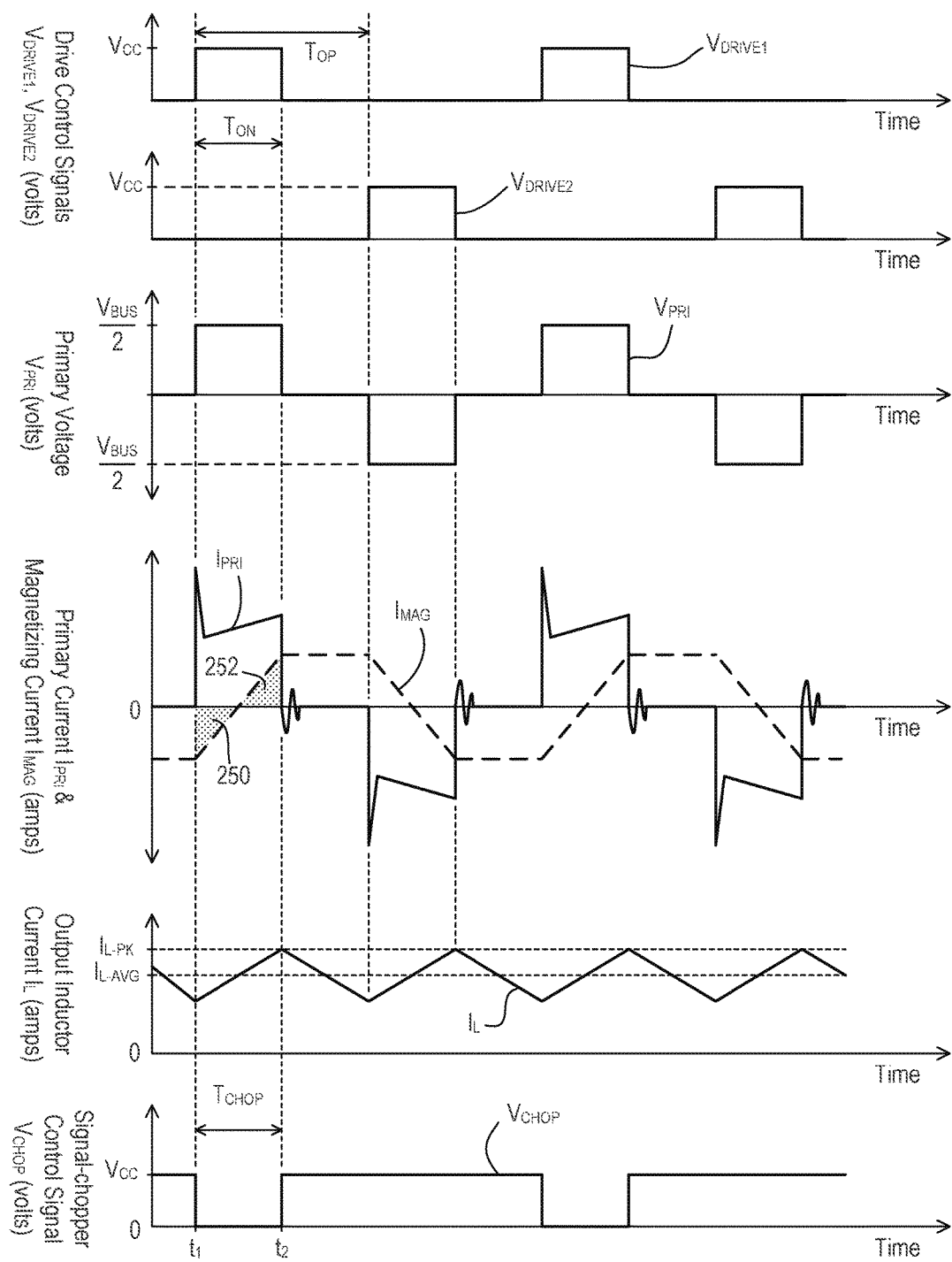
FIG. 7 shows example waveforms illustrating the operation of a forward converter and a current sense circuit when the intensity of an LED light source is near a high-end intensity.

FIG. 7 shows example waveforms illustrating the operation of a forward converter and a current sense circuit, for example, the forward converter 240 and the current sense circuit 260 shown in FIG. 5. For example, the forward converter 240 may generate the waveforms shown in FIG. 7 when operating in the normal mode and in the active state of the burst mode as described herein. As shown in FIG. 7, a control circuit (e.g., the control circuit 150) may drive the respective drive control signals $V_{DRIVE1}$, $V_{DRIVE2}$ high to approximately the supply voltage $V_{CC}$ to render the respective FETs Q210, Q212 conductive for an on time $T_{ON}$ at different times (i.e., the FETs Q210, Q212 are conductive at different times). When the high-side FET Q210 is conductive, the primary winding of the transformer 220 may conduct a primary current $I_{PRI}$ to circuit common through the capacitor C216 and sense resistor R222. After (e.g., immediately after) the high-side FET Q210 is rendered conductive (at time $t_1$ in FIG. 7), the primary current $I_{PRI}$ may conduct a short high-magnitude pulse of current due to the parasitic capacitance $C_{P3}$ of the transformer 220 as shown in FIG. 7. While the high-side FET Q210 is conductive, the capacitor C216 may charge, such that a voltage having a magnitude of approximately half of the magnitude of the bus voltage $V_{BUS}$ is developed across the capacitor. Accordingly, the magnitude of the primary voltage $V_{PRI}$ across the primary winding of the transformer 220 may be equal to approximately half of the magnitude of the bus voltage $V_{BUS}$ (i.e., $V_{BUS}/2$). When the low-side FET Q212 is conductive, the primary winding of the transformer 220 may conduct the primary current $I_{PRI}$ in an opposite direction and the capacitor C216 may be coupled across the primary winding, such that the primary voltage $V_{PRI}$ may have a negative polarity with a magnitude equal to approximately half of the magnitude of the bus voltage $V_{BUS}$.

When either of the high-side and low-side FETs Q210, Q212 are conductive, the magnitude of an output inductor current $I_L$ conducted by the output inductor L226 and the magnitude of the load voltage $V_{LOAD}$ across the LED light source 202 may increase with respect to time. The magnitude of the primary current $I_{PRI}$ may increase with respect to time while the FETs Q210, Q212 are conductive (e.g., after an initial current spike). When the FETs Q210, Q212 are non-conductive, the output inductor current $I_L$ and the load voltage $V_{LOAD}$ may decrease in magnitude with respective to time. The output inductor current $I_L$ may be characterized by a peak magnitude $I_{L-PK}$ and an average magnitude $I_{L-AVG}$, for example, as shown in FIG. 7. The control circuit 150 may increase and/or decrease the on times $T_{ON}$ of the drive control signals $V_{DRIVE1}$, $V_{DRIVE2}$ (e.g., and the duty cycle $DC_{INV}$ of the inverter voltage $V_{INV}$) to respectively increase and decrease the average magnitude $I_{L-AVG}$ of the output inductor current $I_L$, and thus respectively increase and decrease the intensity of the LED light source 202.

When the FETs Q210, Q212 are rendered non-conductive, the magnitude of the primary current $I_{PRI}$ may drop toward zero amps (e.g., as shown at time $t_2$ in FIG. 7 when the high-side FET Q210 is rendered non-conductive). However, a magnetizing current $I_{MAG}$ may continue to flow through the primary winding of the transformer 220 due to the magnetizing inductance $L_{MAG}$ of the transformer. When the target intensity $L_{TRGT}$ of the LED light source 102 is near the low-end intensity $L_{LE}$, the magnitude of the primary current $I_{PRI}$ may oscillate after either of the FETs Q210, Q212 is rendered non-conductive, for example, due to the parasitic capacitances $C_{P1}$, $C_{P2}$ of the FETs, the parasitic capacitance $C_{P3}$ of the primary winding of the transformer 220, and/or any other parasitic capacitances of the circuit, such as, parasitic capacitances of the printed circuit board on which the forward converter 240 is mounted.

The real component of the primary current $I_{PRI}$ may indicate the magnitude of the secondary current $I_{SEC}$ and thus the intensity of the LED light source 202. However, the magnetizing current $I_{MAG}$ (i.e., the reactive component of the primary current $I_{PRI}$) may also flow through the sense resistor 8222. The magnetizing current $I_{MAG}$ may change from a negative polarity to a positive polarity when the high-side FET Q210 is conductive, change from a positive polarity to a negative polarity when the low-side FET Q212 is conductive, and remain constant when the magnitude of the primary voltage $V_{PRI}$ is zero volts, for example, as shown in FIG. 7. The magnetizing current $I_{MAG}$ may have a maximum magnitude defined by the following equation:

$$I_{MAG-MAX} = \frac{V_{BUS} \cdot T_{HC}}{4 \cdot T_{MAG}}.$$

where $T_{HC}$ may be the half-cycle period of the inverter voltage $V_{INV}$, i.e., $T_{HC}=T_{OP}/2$. As shown in FIG. 7, the areas 250, 252 are approximately equal, such that the average value of the magnitude of the magnetizing current $I_{MAG}$ is zero during the period of time when the magnitude of the primary voltage $V_{PRI}$ is greater than approximately zero volts (e.g., during the ton time $T_{ON}$ as shown in FIG. 7).

The current sense circuit 260 may determine an average the primary current $I_{PRI}$ during the positive cycles of the inverter voltage $V_{INV}$, i.e., when the high-side FET Q210 is conductive (e.g., during the on time $T_{ON}$). The load current feedback signal $V_{I-LOAD}$, which may be generated by the current sense circuit 260, may have a DC magnitude that is the average value of the primary current $I_{PRI}$ when the high-side FET Q210 is conductive. Because the average value of the magnitude of the magnetizing current $I_{MAG}$ is approximately zero during the period of time that the high-side FET Q210 is conductive (e.g., during the on time $T_{ON}$), the load current feedback signal $V_{I-LOAD}$ generated by the current sense circuit indicates the real component (e.g., only the real component) of the primary current $I_{PRI}$ during the on time $T_{ON}$.

When the high-side FET Q210 is rendered conductive, the control circuit 150 may drive the signal-chopper control signal $V_{CHOP}$ low towards circuit common to render the transistor Q236 of the current sense circuit 260 non-conductive for a signal-chopper time $T_{CHOP}$. The signal-chopper time $T_{CHOP}$ may be approximately equal to the on time $T_{ON}$ of the high-side FET Q210, for example, as shown in FIG. 7. The capacitor C230 may charge from the sense voltage $V_{SENSE}$ through the resistors R232, R234 while the signal-chopper control signal $V_{CHOP}$ is low, such that the magnitude of the load current feedback signal $V_{I-LOAD}$ is the average value of the primary current $I_{PRI}$ and thus indicates the real component of the primary current during the time when the high-side FET Q210 is conductive. When the high-side FET Q210 is not conductive, the control circuit 150 drives the signal-chopper control signal $V_{CHOP}$ high to render the transistor Q236 conductive. Accordingly, the control circuit 150 is able to accurately determine the average magnitude of the load current $I_{LOAD}$ from the magnitude of the load current feedback signal $V_{I-LOAD}$ since the effects of the magnetizing current $I_{MAG}$ and the oscillations of the primary current $I_{PRI}$ on the magnitude of the load current feedback signal $V_{I-LOAD}$ are reduced or eliminated completely.

As the target intensity $L_{TRGT}$ of the LED light source 202 is decreased towards the low-end intensity $L_{LE}$ and the on times $T_{ON}$ of the drive control signals $V_{DRIVE1}$, $V_{DRIVE2}$ get smaller, the parasitic of the load regulation circuit 140 (i.e., the parasitic capacitances $C_{P1}$, $C_{P2}$ of the FETs Q210, Q212, the parasitic capacitance $C_{P3}$ of the primary winding of the transformer 220, and/or other parasitic capacitances of the circuit) may cause the magnitude of the primary voltage $V_{PRI}$ to slowly decrease towards zero volts after the FETs Q210, Q212 are rendered non-conductive.

Figure 8:
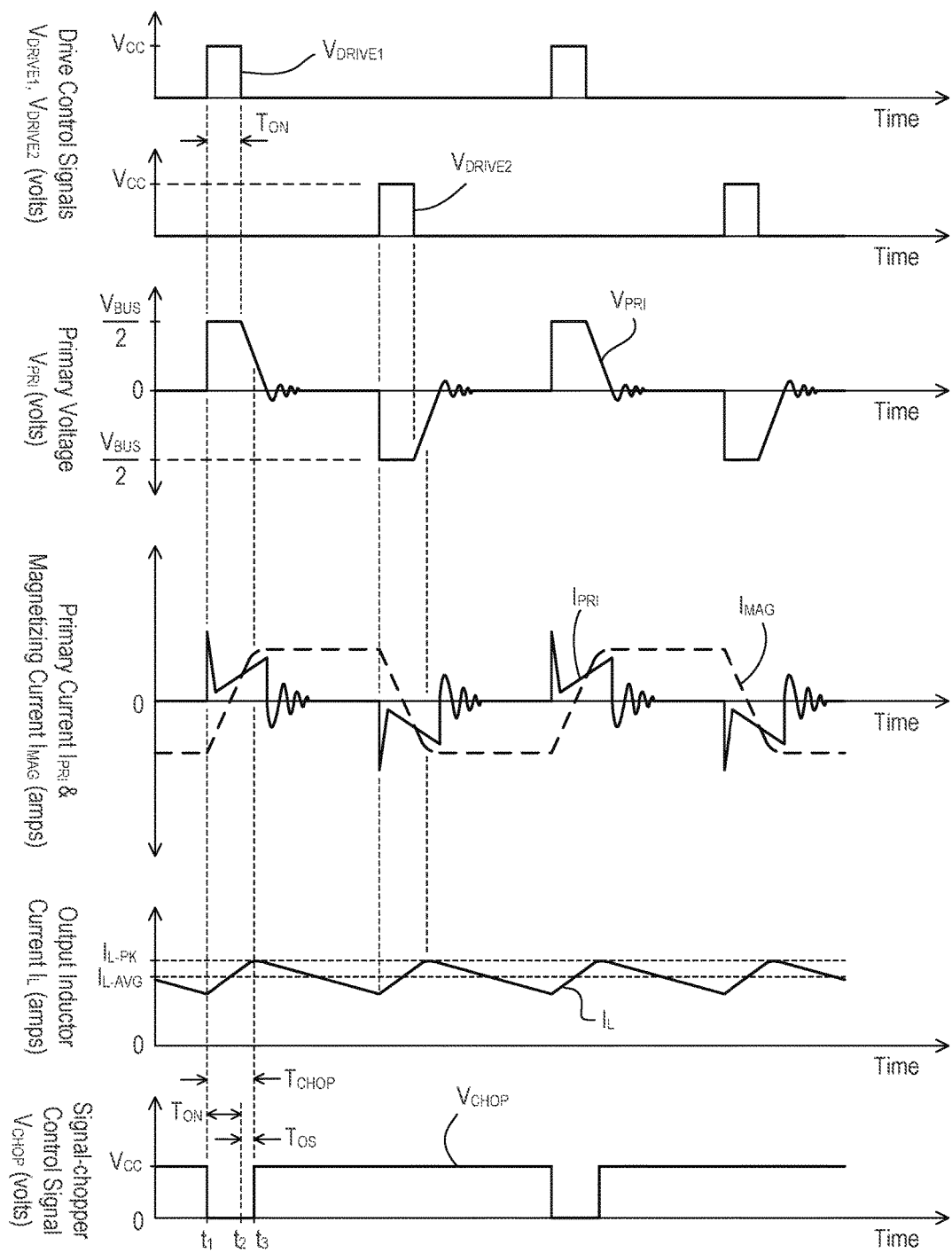
FIG. 8 shows example waveforms illustrating the operation of a forward converter and a current sense circuit when the intensity of an LED light source is near a low-end intensity.

FIG. 8 shows example waveforms illustrating the operation of a forward converter and a current sense circuit (e.g., the forward converter 240 and the current sense circuit 260) when the target intensity $L_{TRGT}$ is near the low-end intensity $L_{LE}$, and when the forward converter 240 is operating in the normal mode and the active state of the burst mode. The gradual drop off in the magnitude of the primary voltage $V_{PRI}$ may allow the primary winding of the transformer 220 to continue to conduct the primary current $I_{PRI}$, such that the transformer 220 may continue to deliver power to the secondary winding after the FETs Q210, Q212 are rendered non-conductive, for example, as shown in FIG. 8. The magnetizing current $I_{MAG}$ may continue to increase in magnitude after the on time $T_{ON}$ of the drive control signal $V_{DRIVE1}$ (e.g., and/or the drive control signal $V_{DRIVE2}$). Accordingly, the control circuit 150 may increase the signal-chopper time $T_{CHOP}$ to be greater than the on time $T_{ON}$. For example, the control circuit 150 may increase the signal-chopper time $T_{CHOP}$ (e.g., during which the signal-chopper control signal $V_{CHOP}$ is low) by an offset time $T_{OS}$ when the target intensity $L_{TRGT}$ of the LED light source 202 is near the low-end intensity $L_{LE}$.

Figure 9:
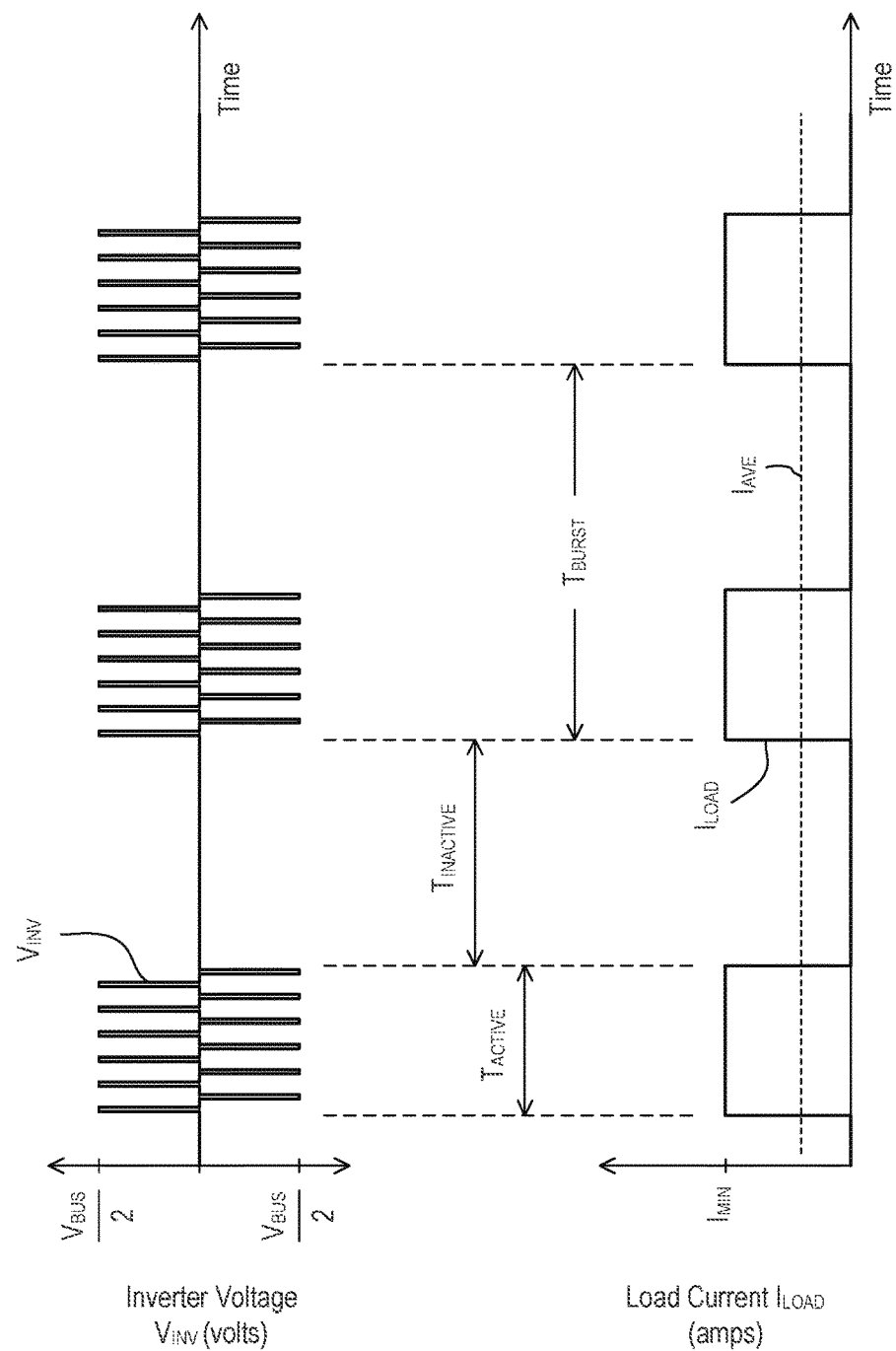
FIG. 9 shows example waveforms illustrating the operation of a forward converter of an LED driver when operating in a burst mode.

FIG. 9 shows example waveforms illustrating the operation of a forward converter when operating in a burst mode (e.g., the forward converter 240 shown in FIG. 5). The inverter circuit of the forward converter 240 may generate the inverter voltage $V_{INV}$ during the active state (e.g., for length of an active state period $T_{ACTIVE}$ as shown in FIG. 9), for example, such that the magnitude of the load current $I_{LOAD}$ may be regulated to the minimum rated current $I_{MIN}$. The inverter voltage $V_{INV}$ may not be generated during the inactive state (e.g., for an inactive state period $T_{INACTIVE}$). The active state may begin on a periodic basis at a burst mode period $T_{BURST}$ (e.g., approximately 4.4 milliseconds). The active state period $T_{ACTIVE}$ and inactive state period $T_{INACTIVE}$ may be characterized by durations that are dependent upon a burst duty cycle $DC_{BURST}$. For example, $T_{ACTIVE}=DC_{BURST} \cdot T_{BURST}$ and $T_{INACTIVE}=(1-DC_{BURST}) \cdot T_{BURST}$. The average magnitude $I_{AVE}$ of the load current $I_{LOAD}$ may be dependent on the burst duty cycle $DC_{BURST}$.

For example, the average magnitude $I_{AVE}$ of the load current $I_{LOAD}$ may be equal to the burst duty cycle $DC_{BURST}$ times the load current $I_{LOAD}$ (e.g., $I_{AVE}=DC_{BURST} \cdot I_{LOAD}$), which in one example may be the minimum load current $I_{MIN}$ (e.g., $I_{AVE}=DC_{BURST} \cdot I_{MIN}$).

The burst duty cycle $DC_{BURST}$ may be controlled to adjust the average magnitude $I_{AVE}$ of the load current $I_{LOAD}$. For example, the burst mode period $T_{BURST}$ may be held constant and the length of the active state period $T_{ACTIVE}$ may be varied to adjust the duty cycle $DC_{BURST}$, which in turn may vary the average magnitude $I_{AVE}$ of the load current $I_{LOAD}$. For example, the active state period $T_{ACTIVE}$ may be held constant, and the length of burst mode period $T_{BURST}$ may be varied to adjust the burst duty cycle $DC_{BURST}$, which in turn may vary the average magnitude $I_{AVE}$ of the load current $I_{LOAD}$. Accordingly, as the burst duty cycle $DC_{BURST}$ is increased, the average magnitude $I_{AVE}$ of the load current $I_{LOAD}$ may increase, and as the burst duty cycle $DC_{BURST}$ is decreased, the average magnitude $I_{AVE}$ of the load current $I_{LOAD}$ may decrease. As described herein, the control circuit 150 may adjust the burst duty cycle $DC_{BURST}$ in response to the target intensity $L_{TRGT}$ using open loop control. The control circuit 150 may be configured to adjust the burst duty cycle $DC_{BURST}$ using closed loop control (e.g., in response to the load current feedback signal $V_{I-LOAD}$).

Figure 10:
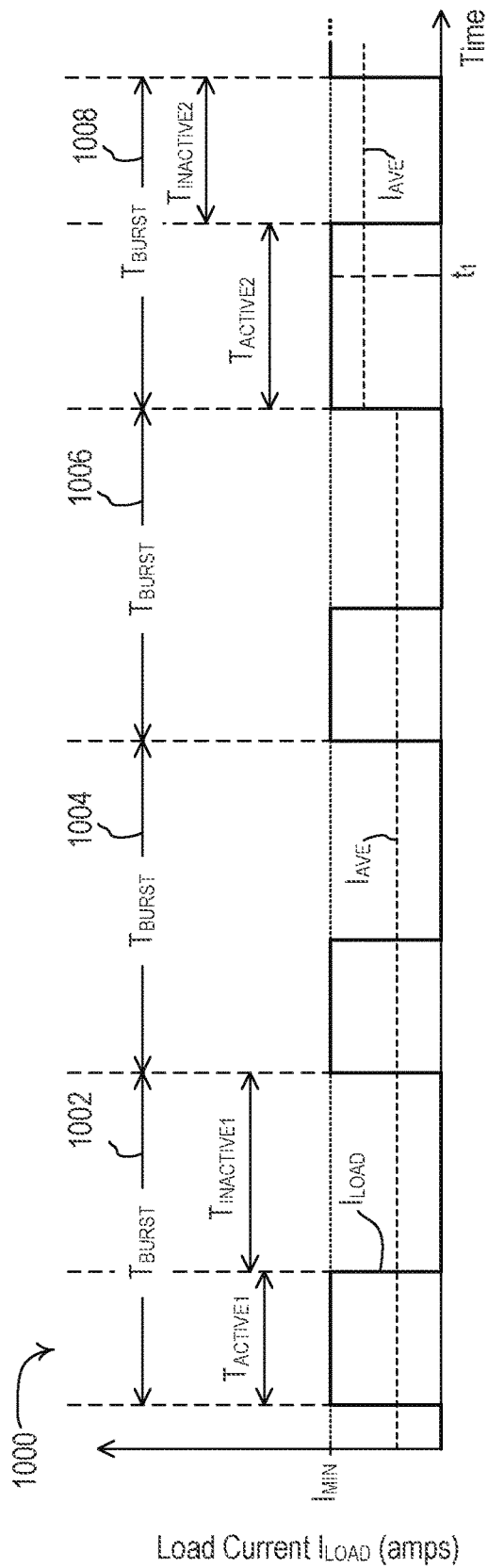
FIG. 10 is a diagram of an example waveform illustrating a load current when a load regulation circuit is operating in a burst mode.

FIG. 10 is a diagram of an example waveform 1000 illustrating the load current $I_{LOAD}$ when a load regulation circuit (e.g., the load regulation circuit 140) is operating in a burst mode, for example, as the target intensity $L_{TRGT}$ of a light source (e.g., the LED light source 202) is increased (e.g., from the low-end intensity $L_{LE}$). A control circuit (e.g., the control circuit 150 of the LED driver 100 shown in FIG. 1 and/or the control circuit 150 controlling the forward converter 240 and the current sense circuit 260 shown in FIG. 5) may adjust the length of the active state period $T_{ACTIVE}$ of the burst mode period $T_{BURST}$ by adjusting the burst duty cycle $DC_{BURST}$. Adjusting the length of the active state period $T_{ACTIVE}$ may adjust the average magnitude $I_{AVE}$ of the load current $I_{LOAD}$, and in turn the intensity of the light source.

The active state period $T_{ACTIVE}$ of the load current $I_{LOAD}$ may have a length that is dependent upon the length of an inverter cycle of the inverter circuit of the load regulation circuit (e.g., the operating period $T_{OP}$). For example, referring to FIG. 9, the active state period $T_{ACTIVE}$ may comprise six inverter cycles, and as such, may have a length that is equal to the duration of the six inverter cycles. The control circuit may adjust (e.g., increase or decrease) the active state period $T_{ACTIVE}$ by adjusting the number of inverter cycles in the active state period $T_{ACTIVE}$. As such, the control circuit may adjust the active state period $T_{ACTIVE}$ by predetermined time intervals that each correspond to the length of an inverter cycle of the inverter circuit of the load regulation circuit. For example, the adjustment to the active state period $T_{ACTIVE}$ may be made in one or more steps (e.g., with a substantially equal amount of adjustment in each step). The substantially equal amount of adjustment may be equal to, for example, a low-end operating period $T_{OP-LE}$ (e.g., approximately 12.8 microseconds). Therefore, the active state period $T_{ACTIVE}$ may be characterized by one or more inverter cycles, and may be adjusted by adjusting a number of inverter cycles per active state period $T_{ACTIVE}$. As such, the average magnitude $I_{AVE}$ of the load current $I_{LOAD}$ may be adjusted by a predetermined amount (e.g., starting at time t1 shown in FIG. 10) that corresponds, for example, to a change in load current $I_{LOAD}$ due to an increase or decrease of the number of inverter cycles per active state period $T_{ACTIVE}$.

One or more burst mode periods $T_{BURST}$ of the load regulation circuit may be characterized by active state periods $T_{ACTIVE}$ that comprise the same number of inverter cycles. In the example of FIG. 10, three burst mode periods $T_{BURST}$ 1002, 1004, 1006 may be characterized by equivalent active state periods $T_{ACTIVE1}$ (e.g., active state periods $T_{ACTIVE1}$ that have the same number of inverter cycles) and equivalent inactive state periods $T_{INACTIVE1}$. The active state period $T_{ACTIVE2}$ of the burst mode period $T_{BURST}$ 1008 may be larger than the active state periods $T_{ACTIVE1}$ of the other burst mode periods $T_{BURST}$ 1002, 1004, 1006 (e.g., by an additional inverter cycle). The inactive state period $T_{INACTIVE2}$ of the burst mode period $T_{BURST}$ 1008 may be smaller than the inactive state period $T_{INACTIVE1}$ (e.g., by one fewer inverter cycle). In other words, the active state period $T_{ACTIVE2}$ during the burst mode period $T_{BURST}$ 1008 may be increased (e.g., by an additional inverter cycle) as compared to the active state periods $T_{ACTIVE1}$ during the burst mode periods $T_{BURST}$ 1002, 1004, 1006. The inactive state period $T_{ACTIVE2}$ during the burst mode period $T_{BURST}$ 1008 may be decreased (e.g., by one fewer inverter cycle) as compared to the inactive state periods $T_{ACTIVE1}$ during the burst mode periods $T_{BURST}$ 1002, 1004, 1006. The larger active state period $T_{ACTIVE2}$ and smaller inactive state period $T_{INACTIVE2}$ may result in a larger duty cycle and a corresponding larger average magnitude $I_{AVE}$ of the load current $I_{LOAD}$ (e.g., as shown during burst mode period 1008). The amount of increase in the average magnitude $I_{AVE}$ of the load current $I_{LOAD}$ may be in accordance with the additional length (e.g., in terms of inverter cycles) of the active state period $T_{ACTIVE2}$ during the burst mode period $T_{BURST}$ 1008. Therefore, the control circuit may adjust (e.g., increase or decrease) the average magnitude $I_{AVE}$ of the load current $I_{LOAD}$ by adjusting the active state period $T_{ACTIVE}$ (e.g., by increments or decrements of one or more inverter cycles).

Figure 11:
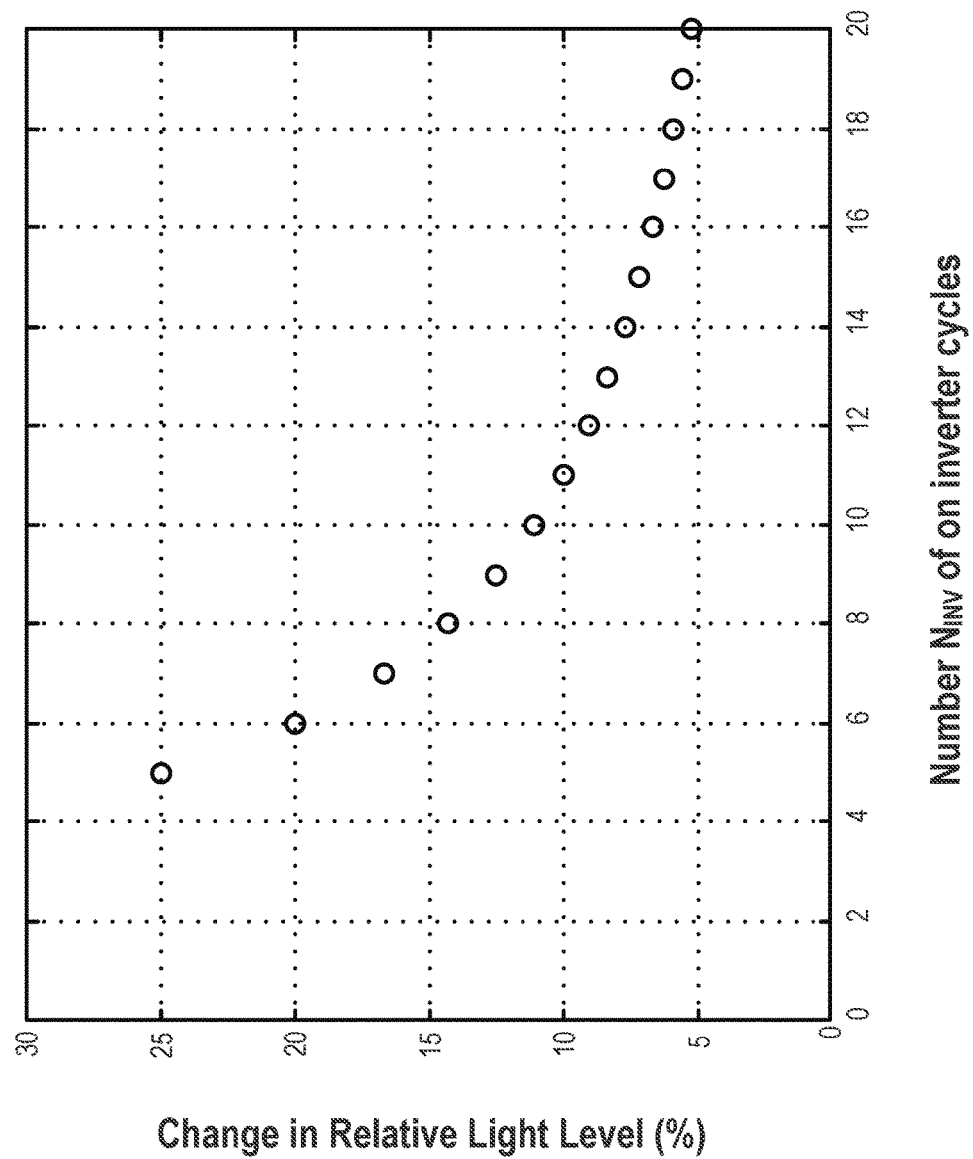
FIG. 11 is an example plot showing how a relative average light level may change as a function of a number of inverter cycles included in an active state period when a load regulation circuit is operating in a burst mode.

A user's eyes may be more sensitive to changes in the relative light level at lower light intensities (e.g., closer to the low-end intensity $L_{LE}$ or when operating in the burst mode). FIG. 11 illustrates how the relative average light level of a lighting load may change as a function of the number $N_{INV}$ of inverter cycles included in the active state period $T_{ACTIVE}$. As described herein, $T_{ACTIVE}$ may be expressed as $T_{ACTIVE}=N_{INV} \cdot T_{OP-LE}$, wherein $T_{OP-LE}$ may represent a low-end operating period of the inverter circuit. As shown in FIG. 11, if the control circuit adjusts the length of the active state period $T_{ACTIVE}$ from four to five inverter cycles, the relative light level may change by approximately 25%. If the control circuit adjusts the length of the active state period $T_{ACTIVE}$ from five to six inverter cycles, the relative light level may change by approximately 20%. The control circuit may be configured to adjust the light intensity of the lighting load with fine granularity when the target intensity $L_{TRGT}$ is close to the low-end intensity $L_{LE}$. Examples of a load control device capable of fine-tuning the light intensity of a lighting load in a low-end intensity range are described in greater detail in commonly-assigned U.S. Pat. No. 9,247,608, issued Jan. 26, 2016, and U.S. patent application Ser. No. 15/142,876, filed Apr. 29, 2016, both entitled LOAD CONTROL DEVICE FOR A LIGHT-EMITTING DIODE LIGHT SOURCE, the entire disclosures of which are hereby incorporated by reference in their entireties.

Figure 12:
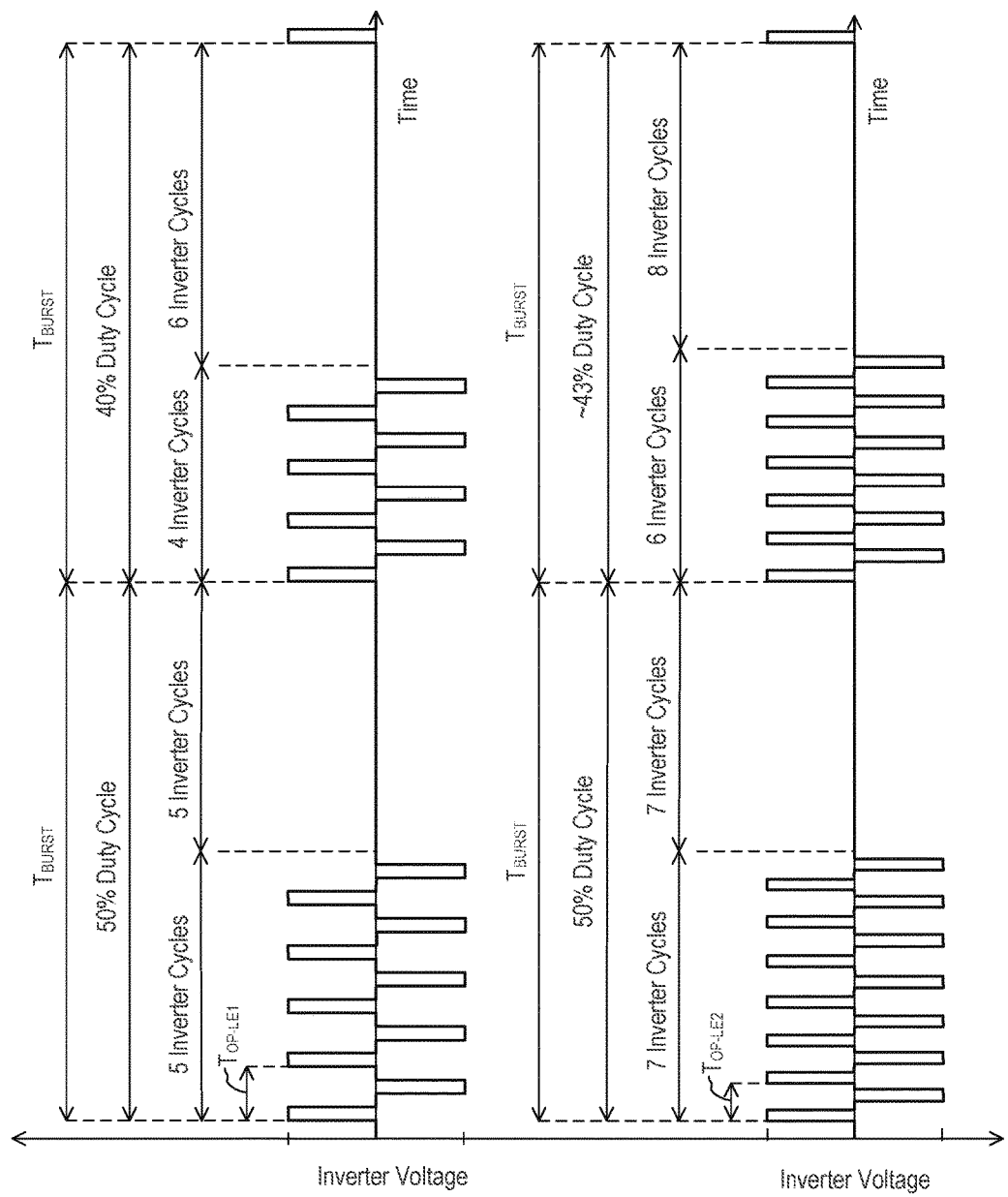
FIG. 12 is an example plot showing how a burst duty cycle may change as a result of including one additional inverter cycle in an active state period when an inverter circuit is operating under two different low-end frequencies.

When the target intensity $L_{TRGT}$ is close to the low-end of the light intensity range, the inverter circuit may be controlled to operate at an adjusted low-end operating frequency $f_{OP-LE-ADJ}$ (or with an adjusted low-end operating period $T_{OP-LE-ADJ}$). An example effect of applying such control may be illustrated by FIG. 12. As shown, when the inverter circuit is operating at a lower frequency $f_{OP-LE1}$ (e.g., corresponding to a longer low-end operating period $T_{OP-LE1}$), adjusting the length of the active state periods by one inverter cycle while keeping the burst operating period unchanged may cause the burst duty cycle to change between 50% and 40% (thus causing the light intensity of the lighting load to change accordingly). When the inverter circuit is operating at a higher frequency $f_{OP-LE2}$ (e.g., corresponding to a shorter low-end operating period $T_{OP-LE2}$), adjusting the length of the active state periods by one inverter cycle while keeping the burst operating period unchanged may cause the burst duty cycle to change between 50% and 43%. In other words, as the operating frequency of the inverter circuit increases, the ability of the control circuit to fine-tune the intensity of the lighting load may increase accordingly. Therefore, when the control circuit is operating in the burst mode and/or when the target intensity $L_{TRGT}$ of the lighting load is near the low-end of its intensity range (e.g., near the low-end transition intensity $L_{TRAN}$, which may be approximately 5%), the control circuit may adjust the low-end operating frequency of the inverter circuit $f_{OP-LE}$ to an adjusted value (e.g., a higher value) such that fine-tuning of the intensity of the lighting load may be achieved, among other goals,.

The operating frequency $f_{OP-LE}$ of the inverter circuit near the low-end intensity (e.g., whether or not the inverter circuit is controlled to operate in the burst mode) may be adjusted based on a minimum on time of the inverter circuit. As described herein, during the active state of the burst mode, the control circuit may be configured to adjust the on time $T_{ON}$ of the drive control signals $V_{DRIVE1}$, $V_{DRIVE2}$ to control the peak magnitude $I_{PK}$ of the load current $I_{LOAD}$ to the minimum rated current $I_{MIN}$ using closed loop control (e.g., in response to the load current feedback signal $V_{I-LOAD}$). The value of the low-end operating frequency may be chosen to ensure that the control circuit does not adjust the on time $T_{ON}$ of the drive control signals $V_{DRIVE1}$, $V_{DRIVE2}$ below the minimum on time $T_{ON-MIN}$. For example, the low-end operating frequency fop may be calculated by assuming worst case operating conditions and component tolerances and stored in memory in the LED driver. Since the LED driver may be configured to drive a plurality of different LED light sources (e.g., manufactured by a plurality of different manufacturers) and/or adjust the magnitude of the load current $I_{LOAD}$ and the magnitude of the load voltage $V_{LOAD}$ to a plurality of different magnitudes, the value of the on time $T_{ON}$ during the active state of the burst mode may be greater than the minimum on time $T_{ON-MIN}$ for many installations. If the value of the on time $T_{ON}$ near the low-end intensity (e.g., during the active state of the burst mode) is too large, steps in the intensity of the LED light source may be visible to a user when the target intensity $L_{TRGT}$ is adjusted near the low-end intensity (e.g., during the burst mode).

Accordingly, when operating near the low-end intensity (e.g., in the burst mode), the control circuit may be configured to minimize the on time $T_{ON}$ of the drive control signals $V_{DRIVE1}$, $V_{DRIVE2}$ until the minimum on time $T_{ONd-MIN}$ is achieved. For example, the control circuit may be configured to periodically adjust the low-end operating period $T_{OP-LE}$ (e.g., decreasing the low-end operating period $T_{OP-LE}$ or increasing the low-end operating frequency $f_{OP-LE}$) while maintaining the duty cycle of the inverter circuit constant, until the on time $T_{ON}$ of the drive control signals $V_{DRIVE1}$, $V_{DRIVE2}$ is equal to or slightly below the minimum on time $T_{ON-MIN}$. The control circuit may be configured to store the adjusted low-end operating period $T_{OP-LE-ADJ}$ and/or the adjusted low-end operating frequency $f_{OP-LE-ADJ}$ in memory. Subsequently, the adjusted low-end operating period $T_{OP-LE-ADJ}$ and/or the adjusted low-end operating frequency $f_{OP-LE-ADJ}$ may be used as the low-end operating period $T_{OP-LE}$ and/or low-end operating frequency $f_{OP-LE}$ when the target intensity $L_{TRGT}$ is close to the low-end of the light intensity range (e.g., during burst mode). The stored adjusted low-end operating period $T_{OP-LE}$ and/or adjusted low-end operating frequency $f_{OP-LE-ADJ}$ may also be used during the normal mode. For example, during the normal mode, the control circuit may adjust the operating frequency $f_{OP}$ of the inverter circuit between the adjusted low-end operating frequency $f_{OP-LE-ADJ}$ and a high-end operating frequency $f_{OP-HE}$. The operating frequency fop may be adjusted as a function (e.g., as a linear function) of the target intensity $L_{TRGT}$ according to an adjusted operating frequency plot 1300 (e.g., as shown in FIG. 13).

FIG. 13 is an example plot of the operating frequency fop of the inverter circuit as a function of the target intensity $L_{TRGT}$. As shown, the low-end operating frequency of the inverter circuit may be controlled from a default low-end operating frequency towards an adjusted low-end operating frequency $f_{OP-LE-ADJ}$ (e.g., approximately 58 kHz) when the target intensity $L_{TRGT}$ is near or below a low-end transition value $L_{TRAN-LOW}$ and/or when the target load current is near or below a low-end transition value $I_{TRAN-LOW}$. The low-end transition intensity $L_{TRAN-LOW}$ may or may not be the same as the low-end transition intensity $L_{TRAN}$ described herein. For example, the low-end transition intensity $L_{TRAN-LOW}$ may be greater than the low-end transition intensity $L_{TRAN}$. Similarly, the low-end transition current $I_{TRAN-LOW}$ may or may not be the same as the minimum rated current $I_{MIN}$ described herein. For example, the low-end transition current $I_{TRAN-LOW}$ may be greater than the minimum rated current $I_{MIN}$. The operating frequency of the inverter circuit may be adjusted (e.g., decreased linearly) as the target intensity $L_{TRGT}$ (or target load current $I_{TRGT}$) is adjusted towards the high-end intensity $L_{HE}$ (or the maximum rated current $I_{MAX}$). The operating frequency may be adjusted to a high-end operating frequency $f_{OP-HE}$ (e.g., approximately 32 kHz) when the target intensity $L_{TRGT}$ reaches a high-end transition value $L_{TRAN-HIGH}$ (or when the target load current $I_{TRGT}$ reaches a high-end transition value $I_{TRAN-HIGH}$). The high-end transition value for the target intensity may be less than or equal to the maximum intensity $L_{HE}$ (e.g., 100%) of the lighting load. The high-end transition value for the target load current may be less than or equal to the maximum rated current $I_{MAX}$ of the lighting load.

As the target intensity $L_{TRGT}$ is controlled between the high-end intensity $L_{HE}$ of the lighting load, the operating frequency $f_{OP}$ of the inverter circuit may be adjusted (e.g., gradually decreased) towards the high-end operating frequency $f_{OP-HE}$. The operating period of the inverter circuit may be adjusted (e.g., gradually increased) accordingly. The adjustment to the operating frequency may be performed as a function of the target intensity $L_{TRGT}$ (or the target load current $I_{TRGT}$). For example, as the target intensity $L_{TRGT}$ or target load current $I_{TRGT}$ increases, the operating frequency of the inverter circuit may be decreased proportionally (e.g., as a linear function of the target intensity $L_{TRGT}$ or the target load current $I_{TRGT}$). The operating frequency may reach the high-end operating frequency fop-HE once the target intensity $L_{TRGT}$ or target load current $I_{TRGT}$ reaches the high-end transition values described herein. The high-end transition value(s) may be predetermined (e.g., determined during system configuration and stored in memory). For example, the high-end transition value(s) may correspond to the maximum intensity (e.g., 100%) or the maximum rated current of the lighting load. Alternatively, the high-end transition value(s) may be set to be less than the maximum intensity (e.g., to 90%) or less than the maximum rated current of the lighting load.

Although the example plot in FIG. 13 shows that the operating frequency $f_{OP}$ is adjusted to and maintained at the adjusted low-end operating frequency $f_{OP-LE-ADJ}$ when the target intensity $L_{TRGT}$ is equal to or less than the low-end transition value $L_{TRAN-LOW}$, the scope of the present disclosure is not limited to only such an implementation. In certain embodiments, the control circuit may be configured to continue to adjust the low-end operating frequency after the target intensity $L_{TRGT}$ is adjusted below the low-end transition value $L_{TRAN-LOW}$. For example, the control circuit may be configured to adjust the low-end operating frequency as a function (e.g., a linear function) of the target intensity $L_{TRGT}$ even when the target intensity $L_{TRGT}$ is adjusted below the low-end transition value $L_{TRAN-LOW}$. In other words, the control circuit may be configured to adjust the operating frequency of the inverter circuit as a function (e.g., a linear function) of the target intensity $L_{TRGT}$ so long as the target intensity $L_{TRGT}$ is less than the high-end transition value $L_{TRAN-HIGH}$. Further, although the example plot in FIG. 13 shows that the adjusted low-end operating frequency $f_{OP-LE-ADJ}$ is higher than the high-end operating frequency $f_{OP-HE}$, the reverse may be true in some embodiments. In other words, the adjusted low-end operating frequency $f_{OP-LE-ADJ}$ may be lower than the high-end operating frequency $f_{OP-HE}$ in some embodiments, and the control circuit may be configured to increase the operating frequency of the inverter circuit as the target intensity $L_{TRGT}$ is adjusted from the low-end transition value $L_{TRAN-LOW}$ to the high-end transition value $L_{TRAN-HIGH}$.

Figure 14:
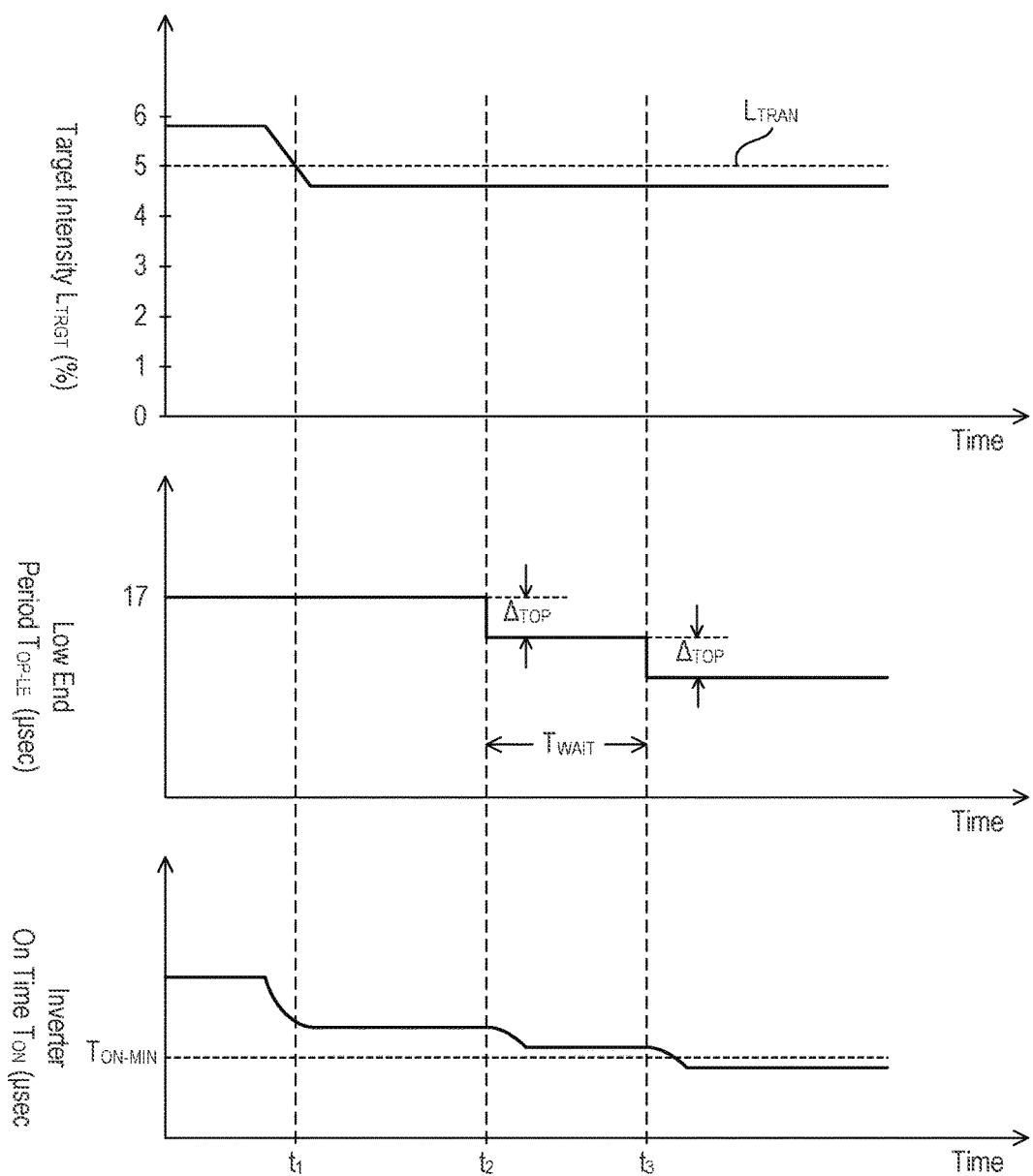
FIG. 14 shows example plots illustrating the operation of a control circuit and an inverter circuit of an LED driver during a burst mode.

FIG. 14 shows example plots illustrating the operation of a control circuit and an inverter circuit of an LED driver (e.g., the control circuit 150 and the inverter circuit of the forward converter 240), for example during the burst mode, to minimize the on time $T_{ON}$ of the drive control signals $V_{DRIVE1}$, $V_{DRIVE2}$ until the minimum on time $T_{ON-MIN}$ is achieved. The target intensity $L_{TRGT}$ may be adjusted in response to digital messages received via a communication circuit (e.g., the communication circuit 180). After the target intensity $L_{TRGT}$ is controlled below the transition intensity $L_{TRAN}$ (e.g., at time ti of FIG. 14 and/or when the control circuit begins to operate the inverter circuit in the burst mode), the on time $T_{ON}$ may be greater than the minimum on time $T_{ON-MIN}$. The control circuit may decrease the low-end operating period $T_{OP-LE}$ (e.g., at time t2) by a predetermined amount $\Delta_{TOP}$ (and thus increase the low-end operating frequency $f_{OP-LE}$). The control circuit may decrease the low-end operating period $T_{OP-LE}$ while maintaining the duty cycle of the inverter circuit constant. The predetermined amount $\Delta_{TOP}$ may be approximately 42 nanoseconds, for example. The control circuit may then determine whether the on time $T_{ON}$ is less than or equal to the minimum on time $T_{ON-MIN}$. In an example, the control circuit may wait for a wait period $T_{WAIT}$ (e.g., approximately ten seconds) before checking to determine if the on time $T_{ON}$ is less than or equal to the minimum on time $T_{ON-MIN}$ (e.g., at time $t_3$). If the on time $T_{ON}$ is still greater than the minimum on time $T_{ON-MIN}$ at time $t_3$, the control circuit may once again decrease the low-end operating period $T_{OP-LE}$ by the predetermined amount $\Delta_{TOP}$ (e.g., at time $t_3$). As shown in FIG. 14, after this decrease in the low-end operating period $T_{OP-LE}$, the on time $T_{ON}$ may decrease below the minimum on time $T_{ON-MIN}$. As described herein, the value of the minimum on time $T_{ON-MIN}$ may be predetermined (e.g., set during configuration and stored in memory) such that the on time of the inverter circuit may be maintained within the hardware limits of the relevant circuitry. Once the on time $T_{ON}$ is decreased to or below the minimum on time $T_{ON-MIN}$, the control circuit may cease reducing the low-end operating period $T_{OP-LE}$. The control circuit may store the final, adjusted value for the low-end operating period $T_{OP-LE}$ (and/or the final, adjusted value for the low-end operating frequency $f_{OP-LE}$) in memory.

Figure 15:
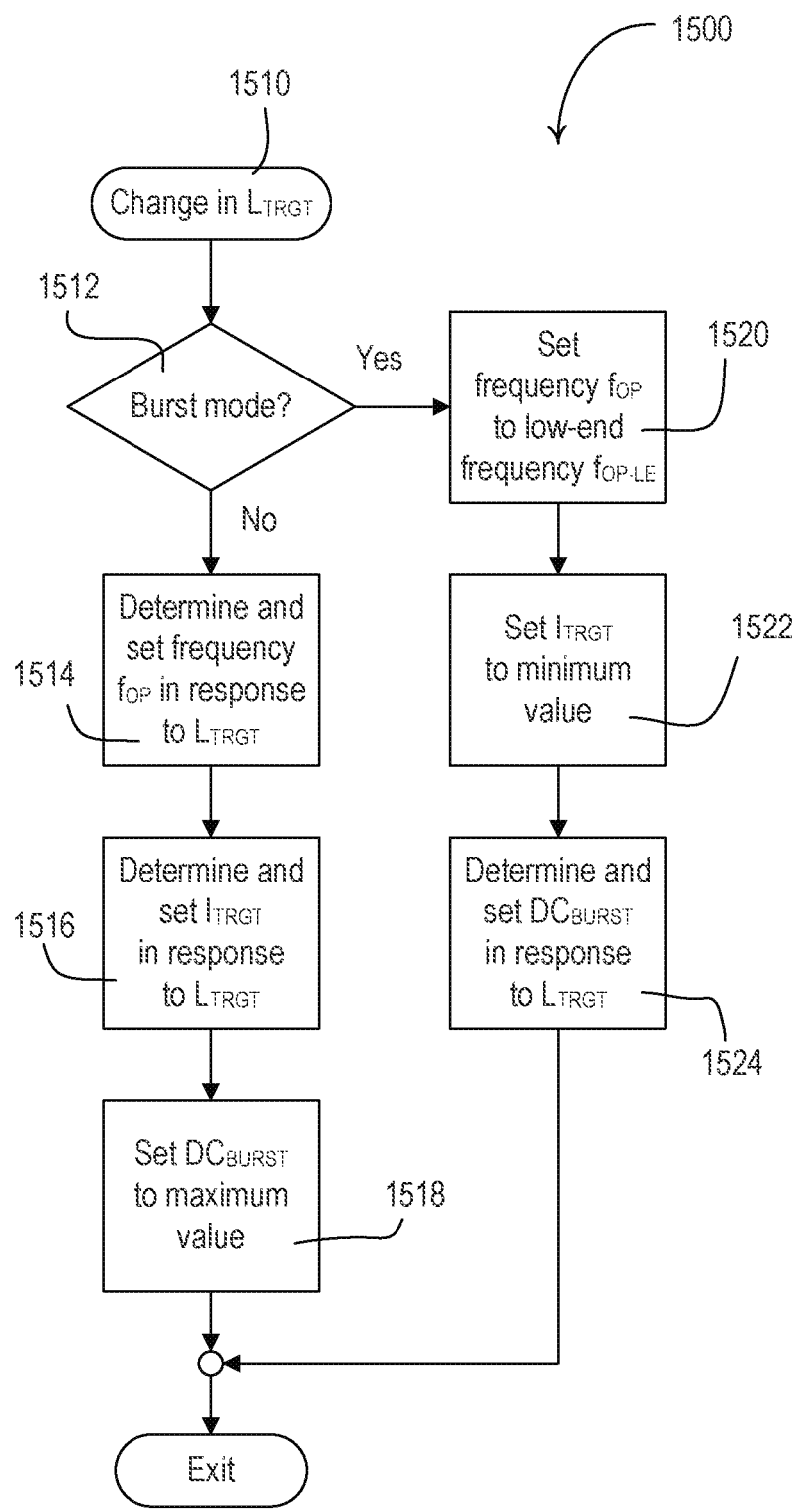
FIG. 15 is a simplified flowchart of an example procedure for operating a forward converter of an LED driver in a normal mode and a burst mode.
Figure 16:
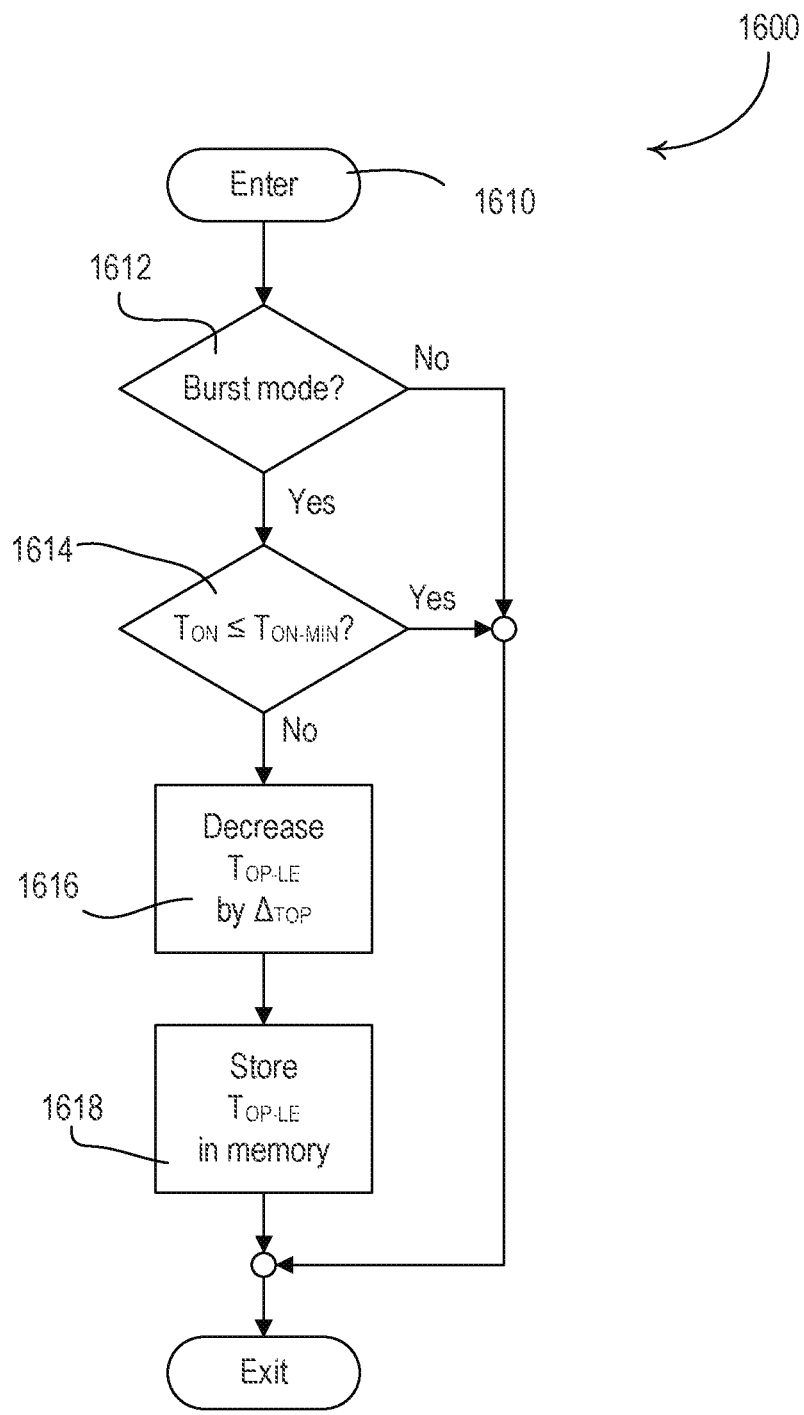
FIG. 16 is a simplified flowchart of an example low-end period adjustment procedure.

FIGS. 15 and 16 are simplified flowcharts of example procedures that may be executed by a control circuit of a load control device (e.g., the control circuit 150 of the LED driver 100 shown in FIG. 1 and/or the control circuit 150 controlling the forward converter 240 and the current sense circuit 260 shown in FIG. 5). FIG. 15 is a simplified flowchart of an example target intensity procedure 1500 that may be executed by the control circuit, e.g., when the target intensity $L_{TRGT}$ is adjusted at 1510 (e.g., in response to digital messages received via the communication circuit 180). The control circuit may determine if it is operating the forward converter near or below the transition intensity $L_{TRAN-LOW}$ (or $L_{TRGT}<L_{TRAN-LOW}$) and/or in the burst mode at 1512. If the control circuit determines that it is not operating the forward converter below the transition intensity $L_{TRAN-LOW}$ or in the burst mode (e.g., but rather in the normal mode), then the control circuit may determine and set the operating frequency fop as a function of the target intensity $L_{TRGT}$ at 1514 (e.g., as shown in FIG. 13). The control circuit may then determine and set the target load current $I_{TRGT}$ as a function of the target intensity $L_{TRGT}$ at 1516 (e.g., as shown in FIG. 2), and/or set the burst duty cycle $DC_{BURST}$ equal to a maximum duty cycle $DC_{MAX}$ (e.g., approximately 100%) at 1518 (e.g., as shown in FIG. 3), before the target intensity procedure 1500 exits.

If the control circuit determines that it is operating the forward converter in the burst mode and/or that the target intensity $L_{TRGT}$ is near or below the transition intensity $L_{TRAN-LOW}$ (e.g., $L_{TRGT}<L_{TRAN-LOW}$), then the control circuit may set the operating frequency fop to the low-end operating frequency $f_{OP-LE}$ at step 1520 and may set the target load current $I_{TRGT}$ to a minimum value (e.g., to the minimum rated current $I_{MIN}$) at 1522 (e.g., as shown in FIG. 2). The control circuit may then determine and set the burst duty cycle $DC_{BURST}$ (if the control circuit is operating in the burst mode) as a function of the target intensity $L_{TRGT}$ at 1524 (e.g., using open loop control as shown in FIG. 3), and the control circuit may exit the target intensity procedure 1500.

FIG. 16 is a simplified flowchart of an example low-end period adjustment procedure 1600 that may be executed by the control circuit (e.g., periodically at every ten seconds) at 1610. If the target intensity $L_{TRGT}$ is below the transition intensity $L_{TRAN-LOW}$ and/or the control circuit is operating in the burst mode at 1612, the control circuit may determine if the present value for the on time $T_{ON}$ is less than or equal to the minimum on time $T_{ON-MIN}$ (e.g., approximately 500 microseconds) at 1614. If not, the control circuit may decrease the low-end operating period $T_{OP-LE}$ by a predetermined amount $\Delta_{TOP}$ at 1616 (e.g., while holding the duty cycle of the inverter circuit constant), and store the new value for the low-end operating period $T_{OP-LE}$ in memory at 1618, before the example low-end period adjustment procedure 1600 exits. The control circuit may continue to periodically execute the example low-end period adjustment procedure 1600 (e.g., at every ten seconds) to decrease the low-end operating period $T_{OP\text{-}LE}$ by the predetermined amount $\Delta_{TOP}$ at 1616 until the on time $T_{ON}$ is determined to be less than or equal to the minimum on time $T_{ON\text{-}MIN}$ at 1614.

The control circuit may adjust the low-end operating period $T_{OP\text{-}LE}$ using the low-end period adjustment procedure 1600 in addition to providing fine tune adjustment of the intensity of the lighting load. For example, the control circuit may be configured to operate in the burst mode when the target intensity $L_{TRGT}$ is below the transition intensity $L_{TRAN}$ and adjust the lengths of the active state period $T_{ACTIVE}$ and/or the inactive state period $T_{INACTIVE}$ at the adjusted low-end operating frequency in order to fine-tune the intensity of the lighting load. Although the disclosure herein describes the low-end operating period adjustment procedure 1600 in the context of burst mode, the procedure may be executed even if the control circuit is not configured to operate in the burst mode.

One or more of the embodiments described herein (e.g., as performed by a load control device) may be used to decrease the intensity of a lighting load and/or increase the intensity of the lighting load. For example, one or more embodiments described herein may be used to adjust the intensity of the lighting load from on to off, off to on, from a higher intensity to a lower intensity, and/or from a lower intensity to a higher intensity. For example, one or more of the embodiments described herein (e.g., as performed by a load control device) may be used to fade the intensity of a light source from on to off (e.g., the low-end intensity $L_{LE}$ may be equal to 0%) and/or to fade the intensity of the light source from off to on.

Although described with reference to an LED driver, one or more embodiments described herein may be used with other load control devices. For example, one or more of the embodiments described herein may be performed by a variety of load control devices that are configured to control of a variety of electrical load types, such as, for example, a LED driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A single control circuit may be coupled to and/or adapted to control multiple types of electrical loads in a load control system.

What is claimed is:

1. A load control device for controlling an amount of power delivered to an electrical load, the load control device comprising:
   a load regulation circuit configured to control a magnitude of a load current conducted through the electrical load to control the amount of power delivered to the electrical load;
   a current sense circuit configured to provide a load current feedback signal that indicates the magnitude of the load current; and
   a control circuit configured to generate at least one drive signal for controlling the load regulation circuit to adjust the magnitude of the load current, the at least one drive signal characterized by an operating period and a duty cycle, the control circuit configured to operate in an active state during an active time period to adjust an on time of the at least one drive signal in response to the load current feedback signal in order to regulate a peak magnitude of the load current towards a target current, the control circuit configured to operate in an inactive state during an inactive time period to stop generating the at least one drive signal in response to the load current feedback signal, the control circuit further configured to adjust an average magnitude of the load current by adjusting a length of the active time period and a length of the inactive time period;
   wherein the control circuit is configured to adjust the operating period of the at least one drive signal to a low-end operating period by adjusting the on time of the at least one drive signal to a value less than or equal to a minimum on time while holding the duty cycle of the at least one drive signal constant.

2. The load control device of claim 1, wherein the control circuit is configured to operate in a normal mode to adjust the magnitude of the average magnitude of the load current above a minimum rated current of the load regulation circuit, and operate in a burst mode to adjust the average magnitude of the load current below the minimum rated current.

3. The load control device of claim 2, wherein, during the normal mode, the control circuit is configured to maintain the operating period of the at least one drive signal at a high-end operating period after the target current reaches a high-end transition value.

4. The load control device of claim 3, wherein the high-end transition value is equal to approximately a maximum rated current of the electrical load.

5. The load control device of claim 3, wherein the high-end transition value is less than a maximum rated current of the electrical load.

6. The load control device of claim 3, wherein the control circuit is configured to adjust the operating period of the at least one drive signal between the low-end operating period and the high-end operating period when the target current is between a low-end transition value and the high-end transition value.

7. The load control device of claim 3, wherein the low-end operating period is shorter than the high-end operating period.

8. The load control device of claim 2, wherein the control circuit is configured to maintain the peak magnitude of the load current at the minimum rated current during the burst mode.

9. The load control device of claim 2, wherein the control circuit is configured to keep the length of the inactive time period at approximately zero seconds during the normal mode.

10. The load control device of claim 1, wherein the control circuit is configured to adjust the length of the active time period in first adjustment steps that are dependent on the low-end operating period.

11. The load control device of claim 10, wherein the control circuit is configured to adjust the length of the active time period in the first adjustment steps while keeping a length of the operating period constant.

12. The load control device of claim 1, wherein the control circuit is further configured to adjust a ratio of the active time period to the inactive time period to adjust the average magnitude of the load current.

13. The load control device of claim 12, wherein the control circuit is configured to determine the target current as a function of a target amount of power to be delivered to the electrical load, and adjust the ratio of the active time period to the inactive time period linearly with respect to the target amount of power.

14. The load control device of claim 1, wherein the control circuit is configured to periodically decrease the operating period of the at least one drive signal by a predetermined amount until the on time of the at least one drive signal is less than or equal to the minimum on time.

15. The load control device of claim 1, wherein the load regulation circuit comprises an LED drive circuit for an LED light source.

16. A method for controlling a load current conducted through an electrical load, the method comprising:
  generating a load current feedback signal that indicates a magnitude of the load current;
  generating at least one drive signal for controlling a load regulation circuit to adjust a magnitude of the load current, the at least one drive signal characterized by an operating period and a duty cycle;
  operating in an active state during an active time period to adjust an on time of the at least one drive signal in response to the load current feedback signal in order to regulate a peak magnitude of the load current towards a target current;
  operating in an inactive state during an inactive time period to stop generating the at least one drive signal in response to the load current feedback signal;
  adjusting an average magnitude of the load current by adjusting a length of the active time period and a length of the inactive time period; and
  adjusting the operating period of the at least one drive signal to a low-end operating period by adjusting the on time of the at least one drive signal to a value less than or equal to a minimum on time while holding the duty cycle of the at least one drive signal constant.

17. The method of claim 16, wherein the average magnitude of the load current is adjusted to be above a minimum rated current of the load regulation circuit during a normal mode and below the minimum rated current during a burst mode.

18. The method of claim 17, further comprising,
  when operating in the normal mode, maintaining the operating period of the at least one drive signal at a high-end operating period after the target current reaches a high-end transition value.

19. The method of claim 16, further comprising:
  adjusting the length of the active time period in first adjustment steps that are dependent on the low-end operating period while keeping a length of the operating period constant.

20. The method of claim 16, wherein adjusting the average magnitude of the load current by adjusting a length of the active time period and a length of the inactive time period comprises adjusting a ratio of the active time period to the inactive time period to adjust the average magnitude of the load current.

* * * * *